United States Patent
Saito

(10) Patent No.: US 8,649,106 B2
(45) Date of Patent: Feb. 11, 2014

(54) ZOOM LENS AND IMAGE PICKUP APPARATUS EQUIPPED WITH THE ZOOM LENS

(75) Inventor: Shinichiro Saito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/549,230

(22) Filed: Jul. 13, 2012

(65) Prior Publication Data

US 2013/0021676 A1    Jan. 24, 2013

(30) Foreign Application Priority Data

Jul. 21, 2011    (JP) .................................. 2011-159787

(51) Int. Cl.
     *G02B 15/14*      (2006.01)

(52) U.S. Cl.
     USPC .......................................... 359/683; 359/686

(58) Field of Classification Search
     CPC ........ G02B 15/00; G02B 15/15; G02B 15/20; G02B 15/163; G02B 15/14
     USPC ...................... 359/676, 683–687; 396/72–88; 348/240.99–240.3, 335–369
     See application file for complete search history.

(56) References Cited

U.S. PATENT DOCUMENTS

| | | | | |
|---|---|---|---|---|
| 5,748,383 A | * | 5/1998 | Ohtake | 359/683 |
| 5,781,348 A | * | 7/1998 | Ohtake | 359/676 |
| 5,828,499 A | * | 10/1998 | Ohtake | 359/676 |
| 7,304,805 B2 | | 12/2007 | Endo | |
| 7,944,622 B2 | | 5/2011 | Hankawa | |

FOREIGN PATENT DOCUMENTS

JP      2007-47538 A      2/2007

\* cited by examiner

*Primary Examiner* — Darryl J Collins
(74) *Attorney, Agent, or Firm* — Canon USA Inc IP Division

(57) ABSTRACT

A zoom lens includes a first lens unit (positive), a second lens unit (negative), a third lens unit (positive), and a rear lens group having one or more lens units. During zooming from the wide-angle end to the telephoto end, the distance between the first and second lens units increases, the distance between the second and third lens units decreases, and the distance between the third lens unit and the rear lens group changes. The first lens unit consists of a positive lens and a negative lens. The following conditional expressions are satisfied:

$8.0 < f1/fW < 30.0$ and $2.0 < \beta 2T/\beta 2W < 10.0$, where f1 is a focal length of the first lens unit, fW is a focal length of the entire system at the wide-angle end, and $\beta 2W$ and $\beta 2T$ are respectively lateral magnifications of the second lens unit at the wide-angle end and the telephoto end.

12 Claims, 19 Drawing Sheets

(WIDE-ANGLE END)

(MIDDLE 1)

(MIDDLE 2)

(TELEPHOTO END)

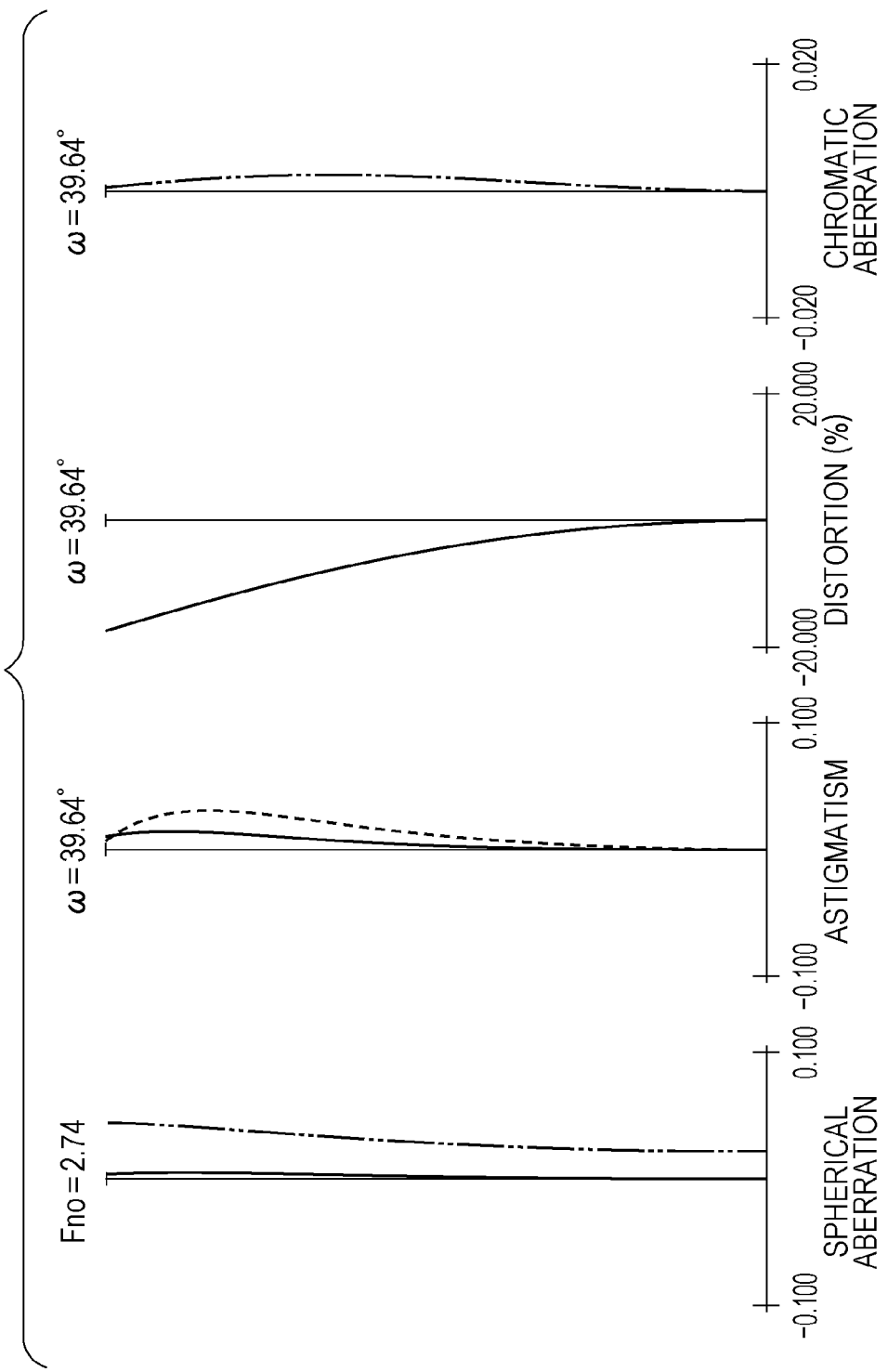

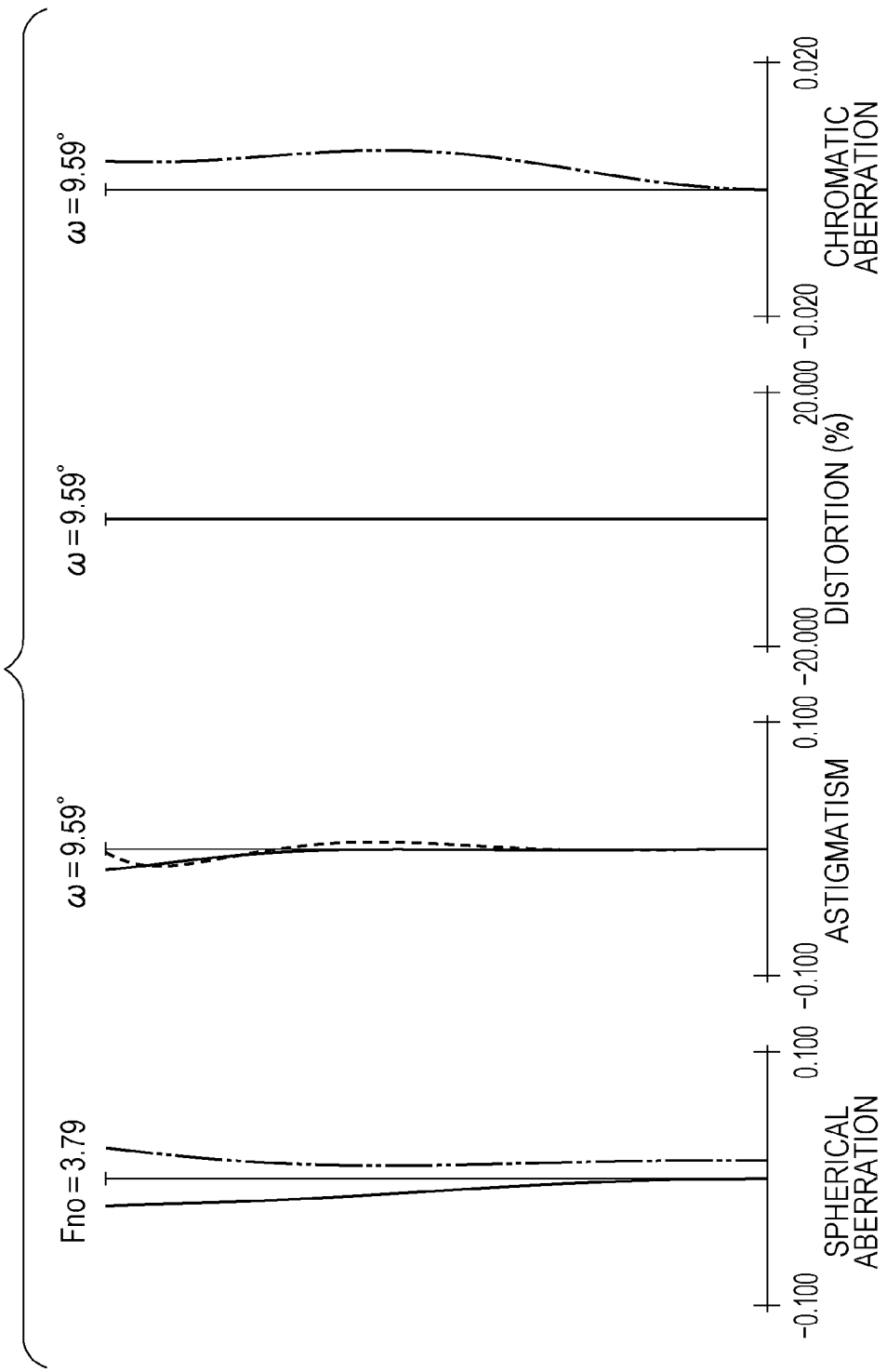

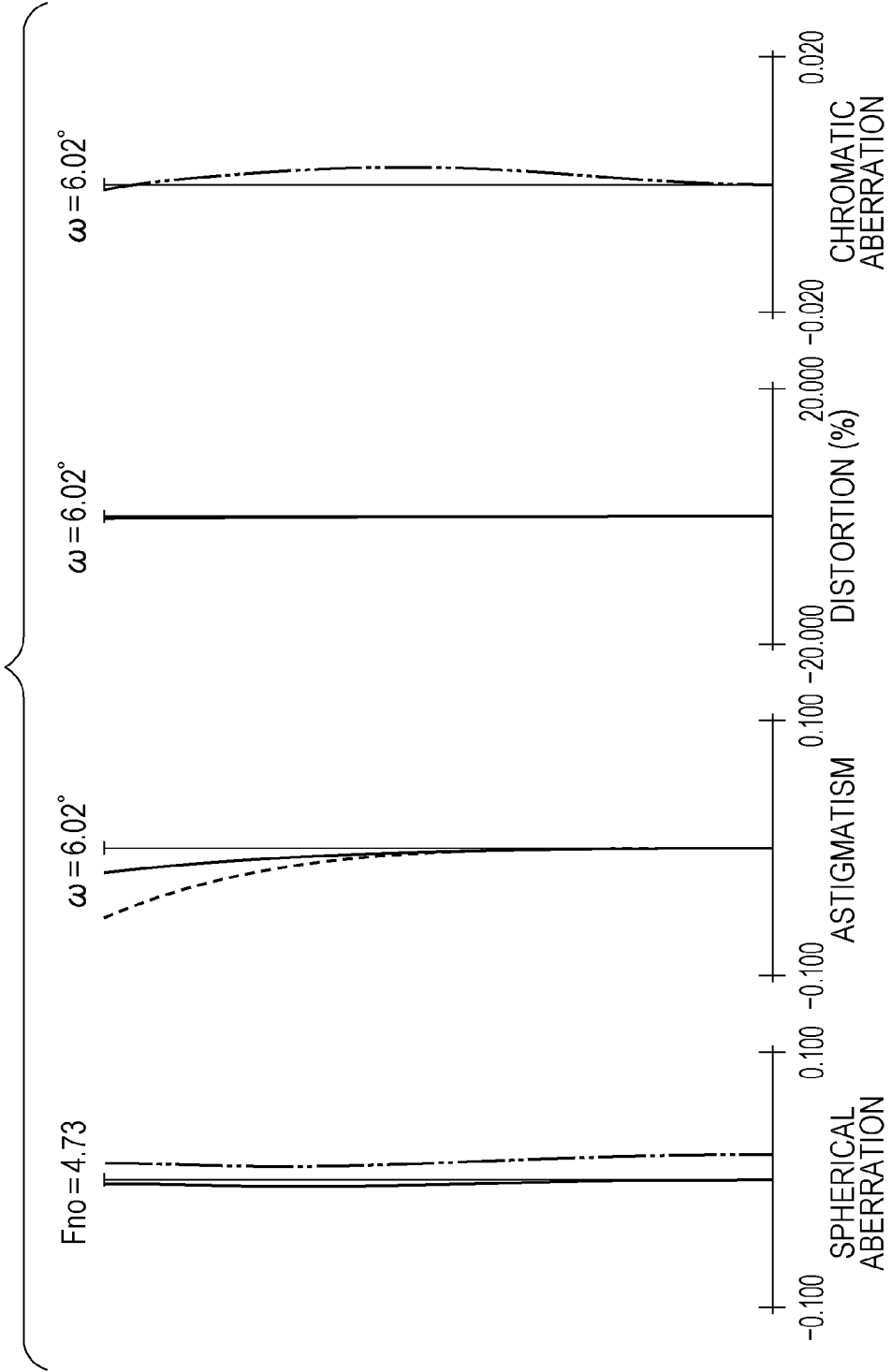

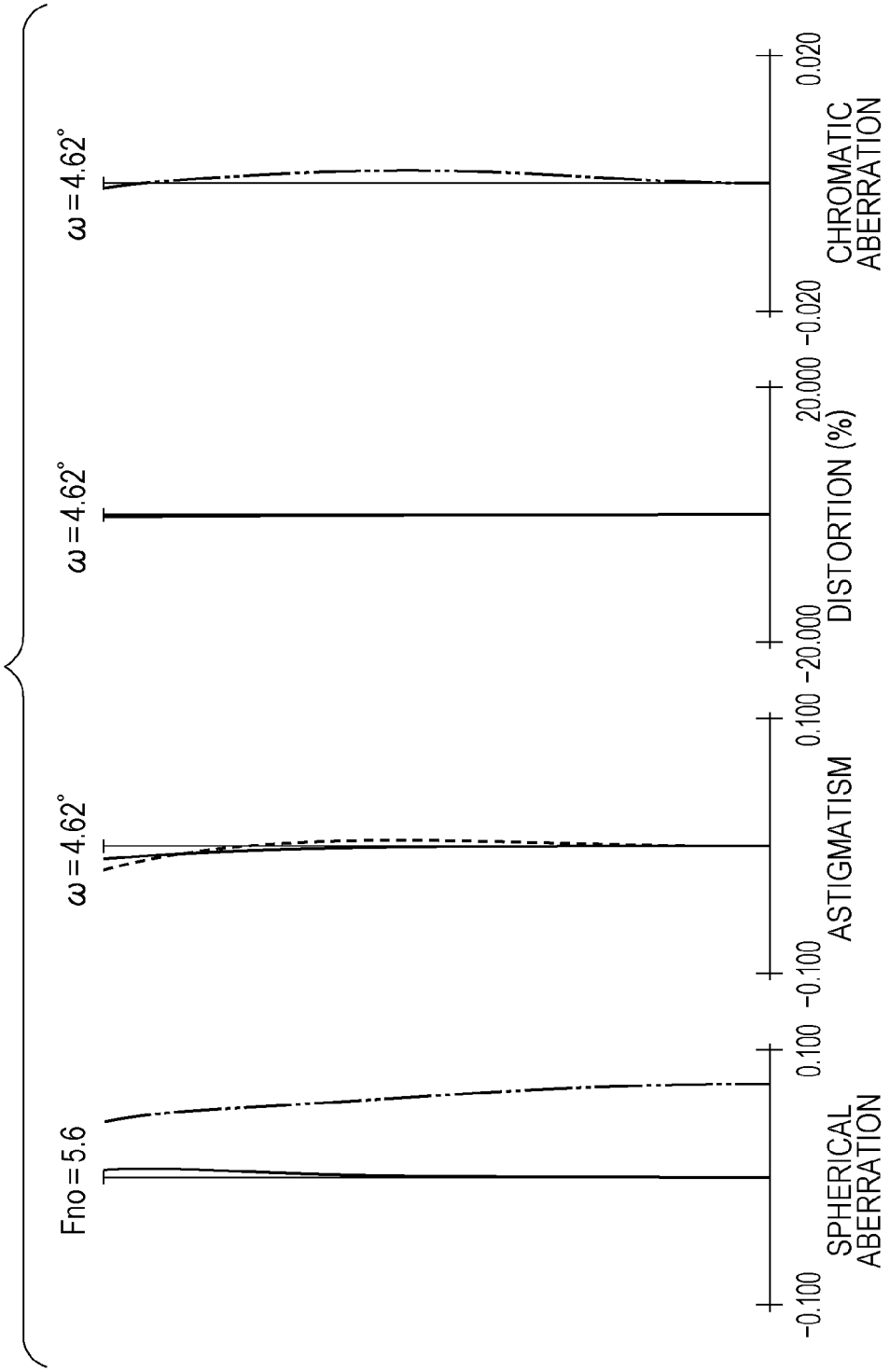

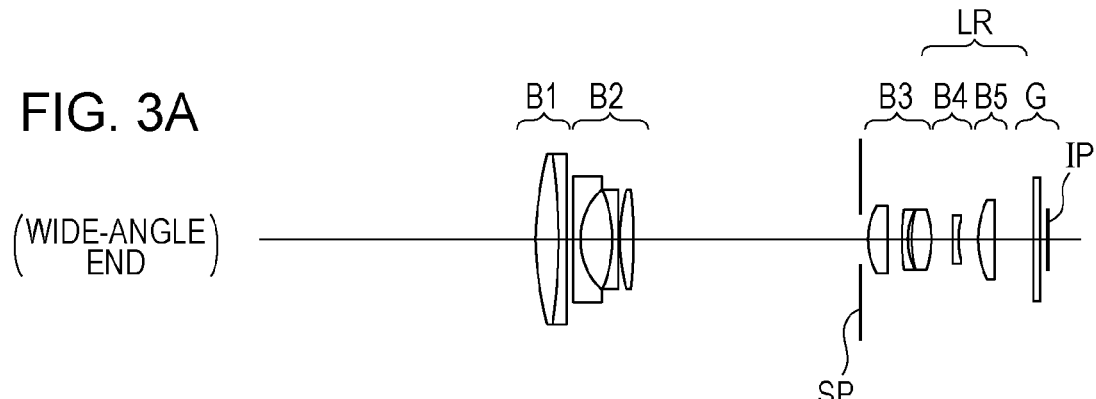
FIG. 3A (WIDE-ANGLE END)
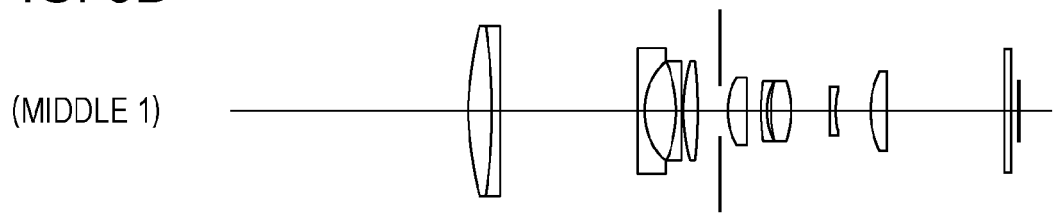
FIG. 3B (MIDDLE 1)
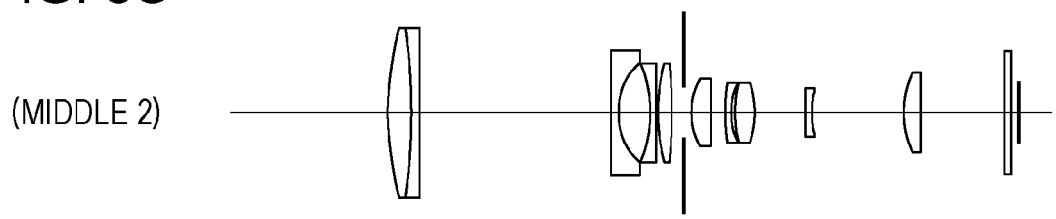
FIG. 3C (MIDDLE 2)
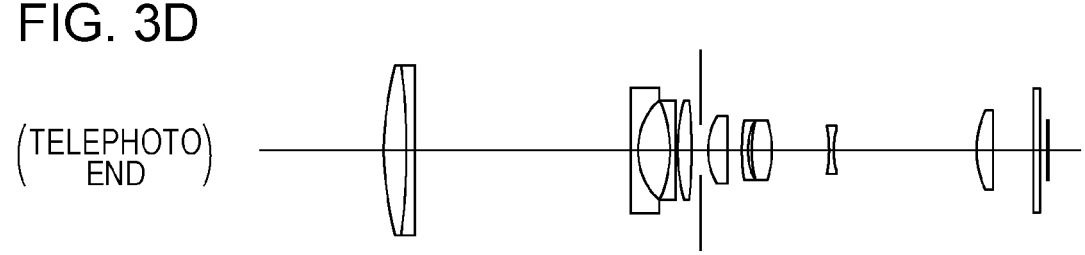
FIG. 3D (TELEPHOTO END)

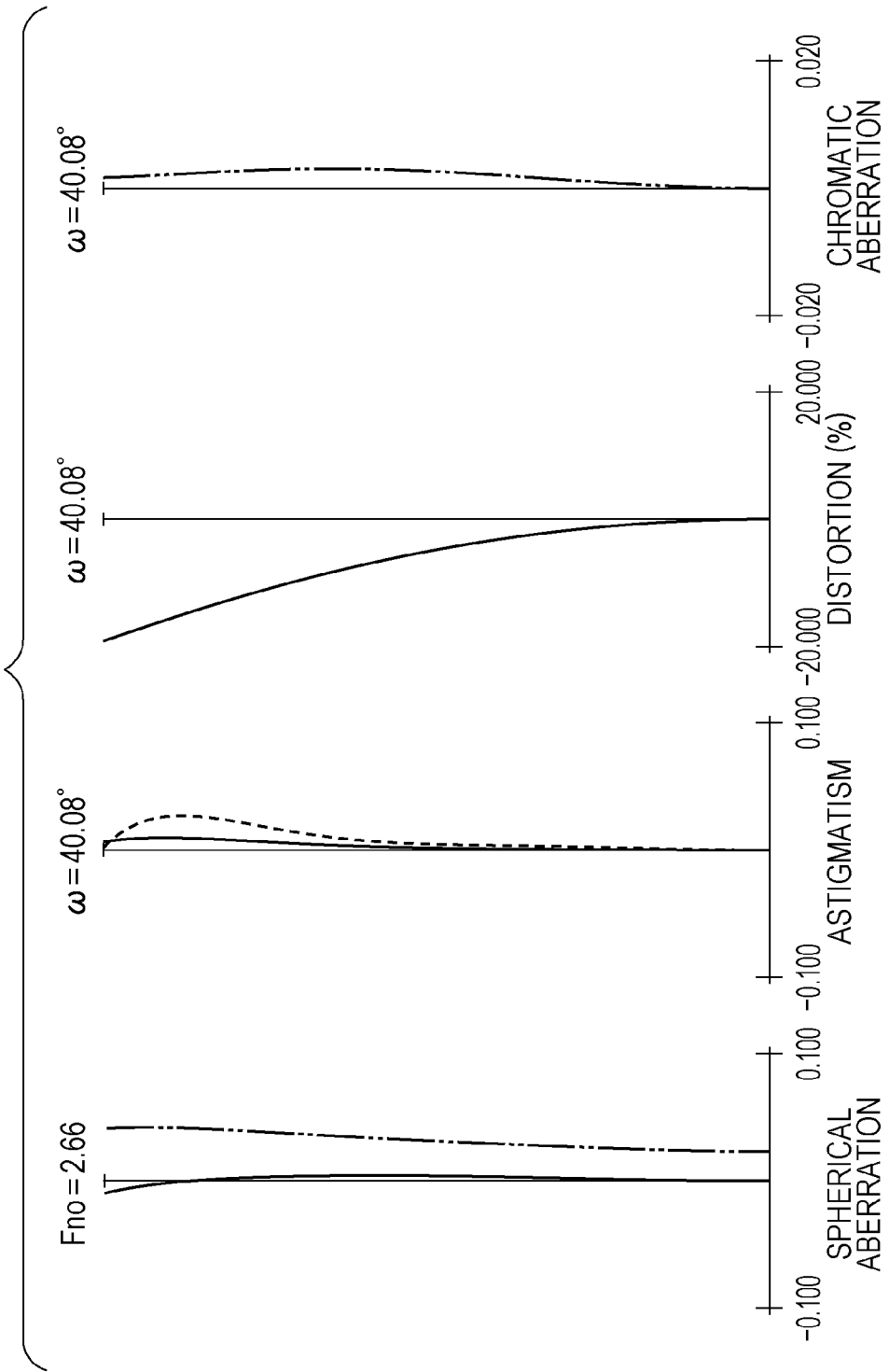

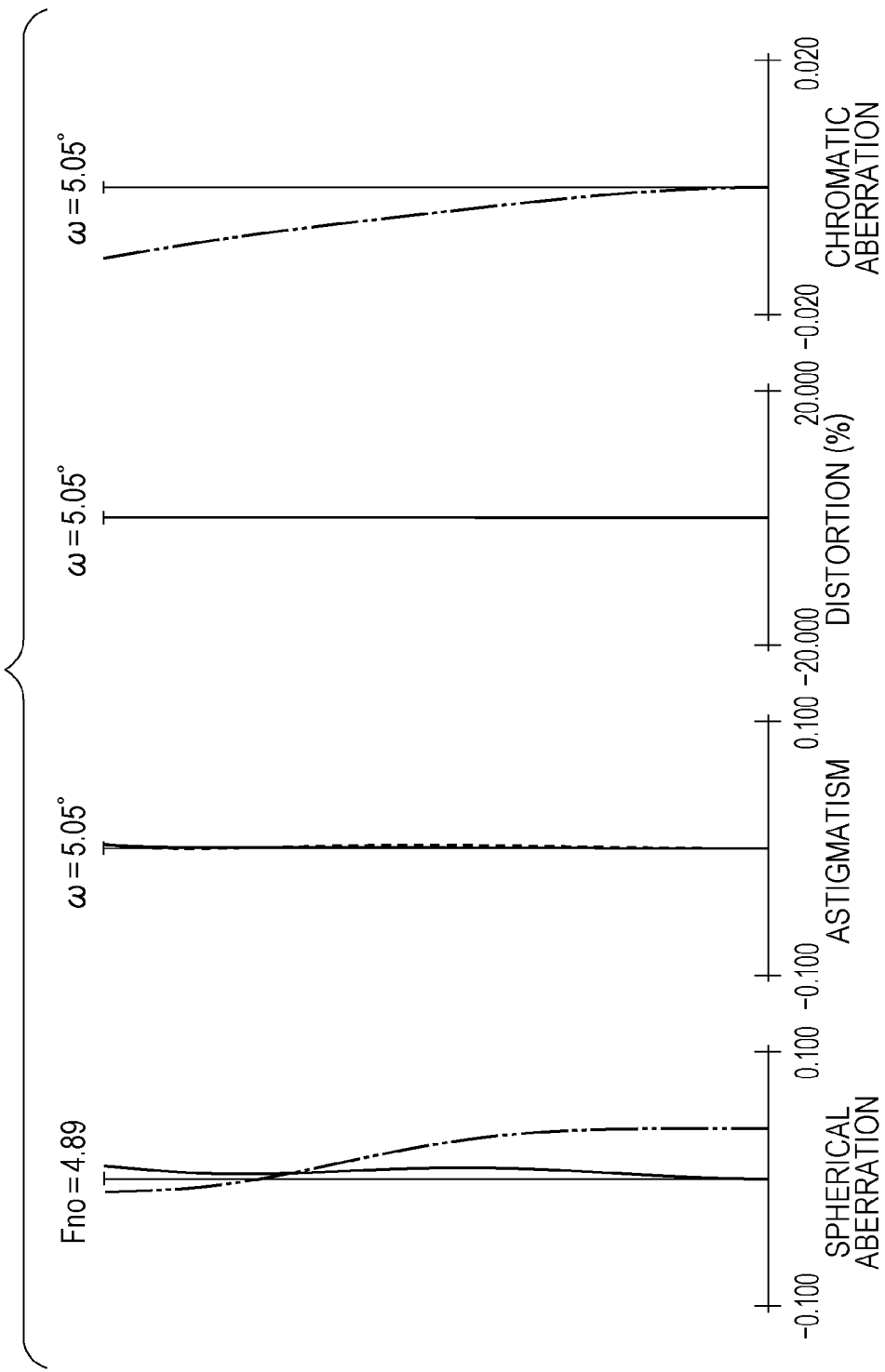

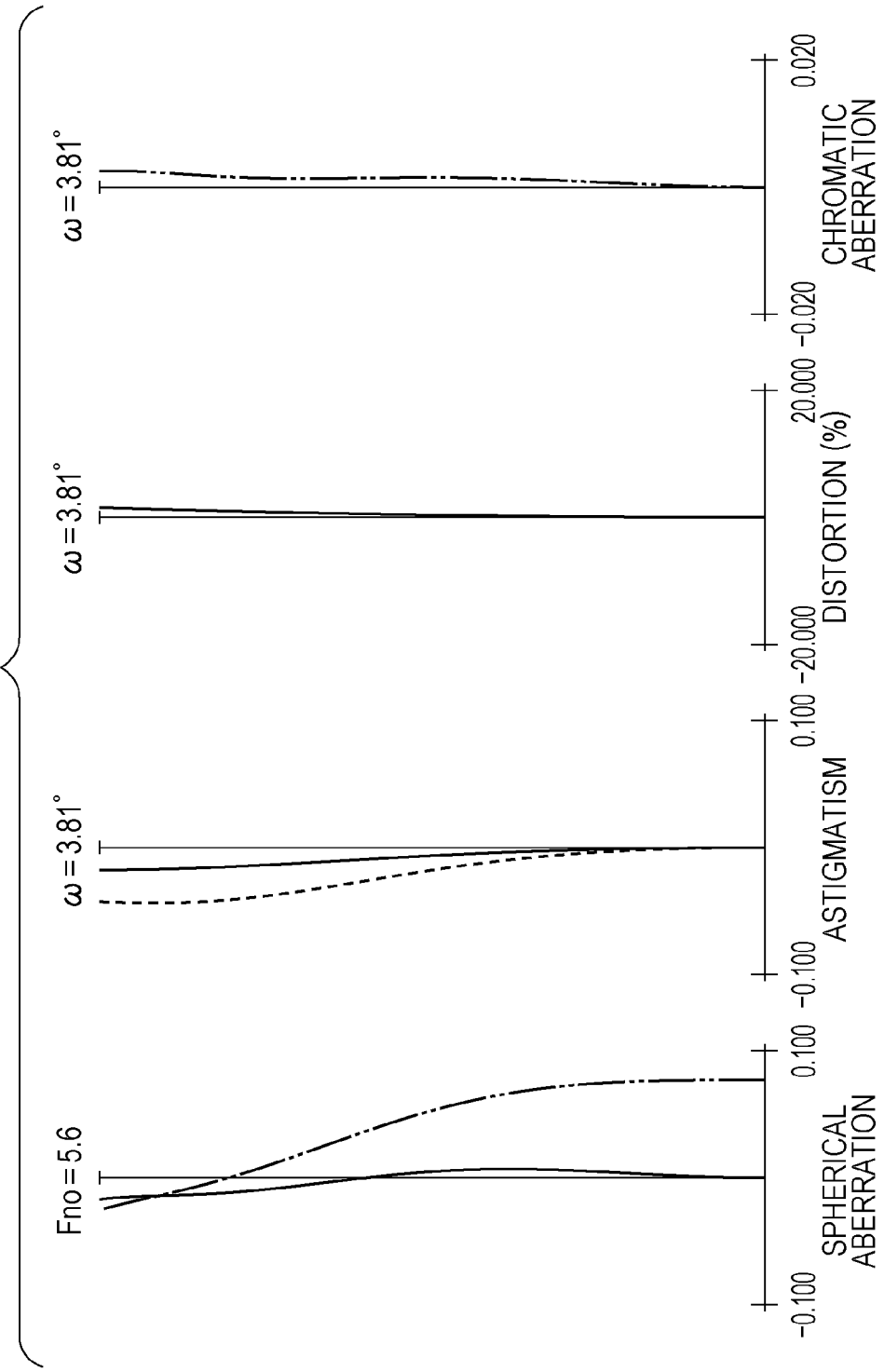

FIG. 5A (WIDE-ANGLE END)
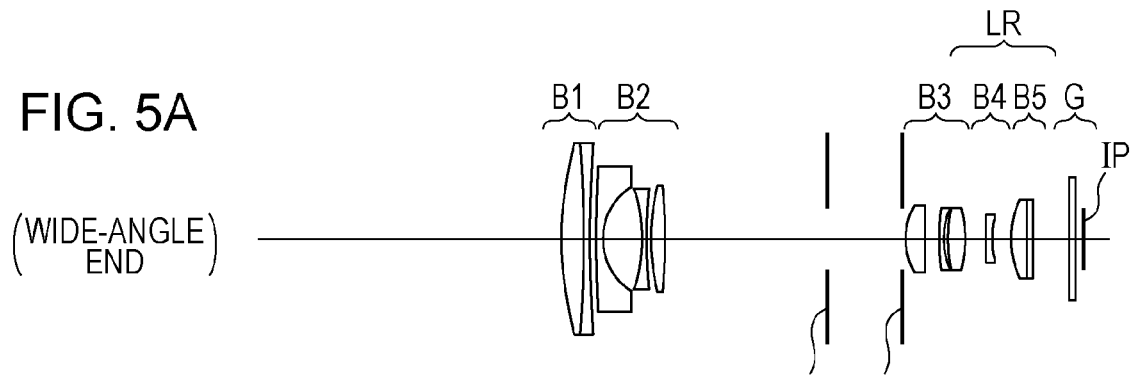
FIG. 5B (MIDDLE 1)
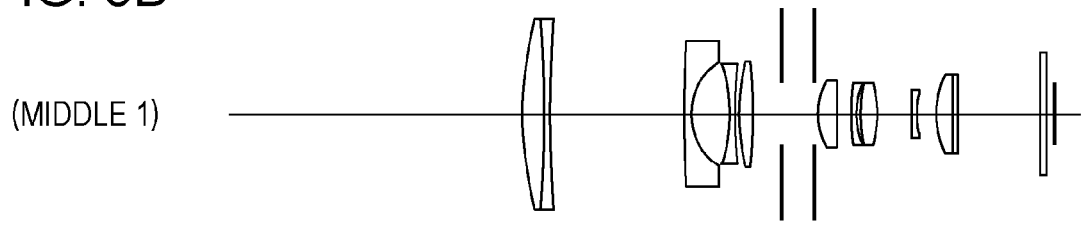
FIG. 5C (MIDDLE 2)
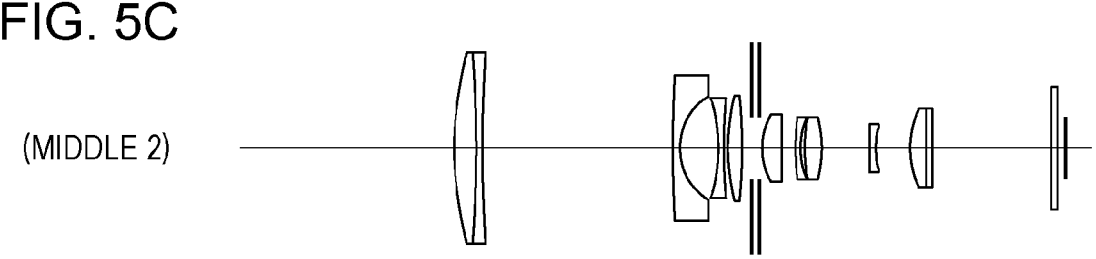
FIG. 5D (TELEPHOTO END)
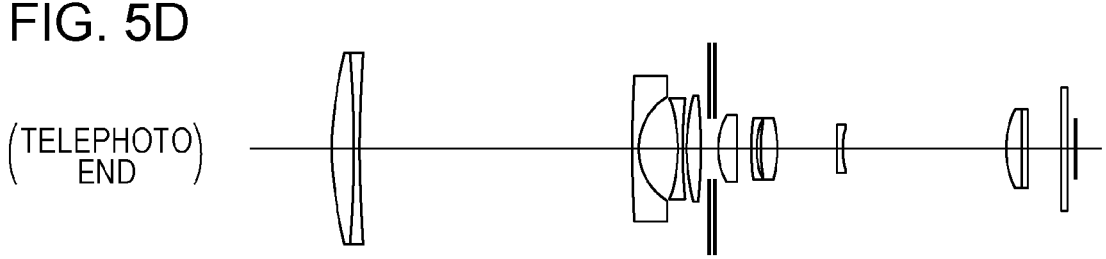

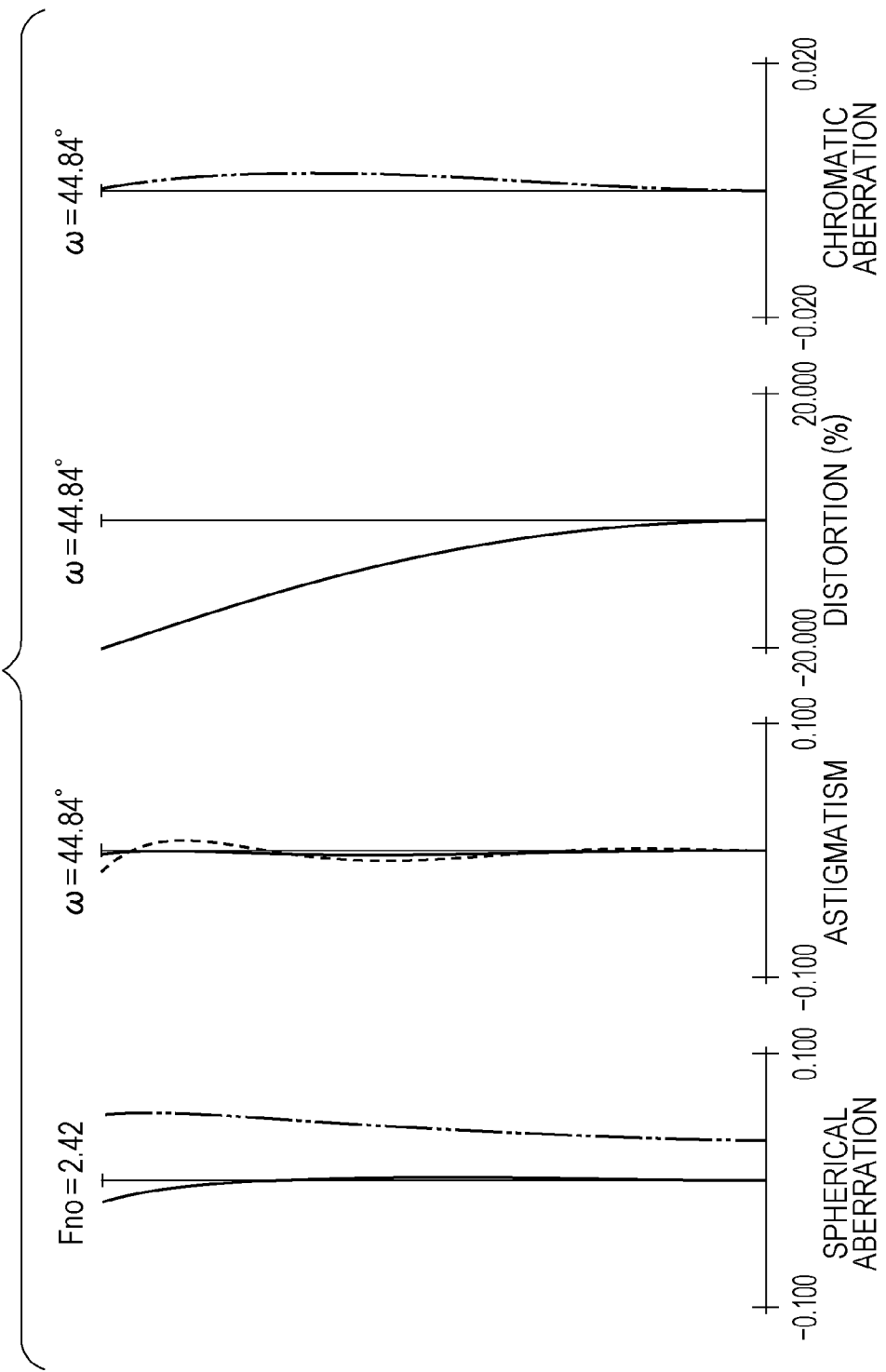

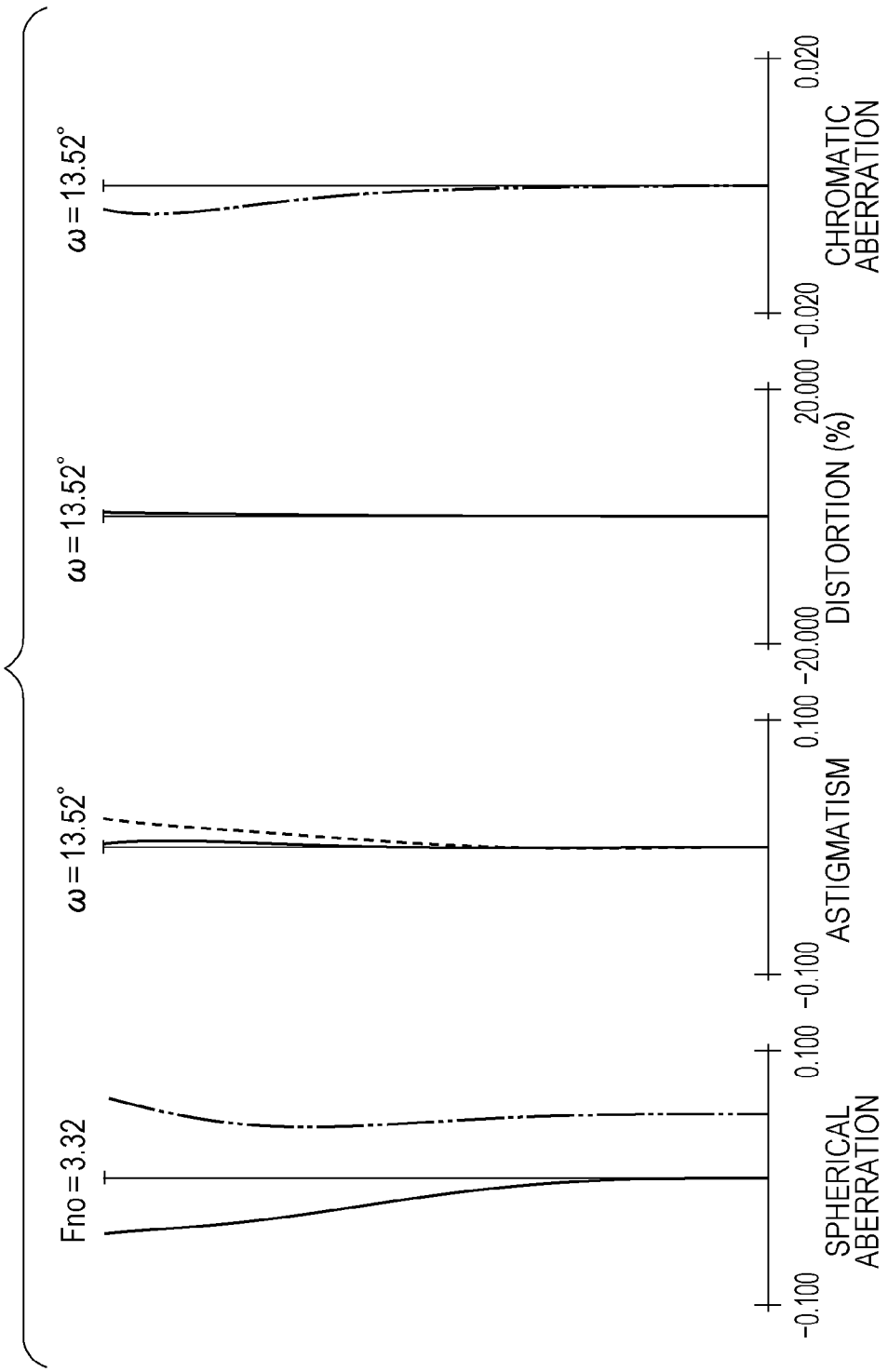

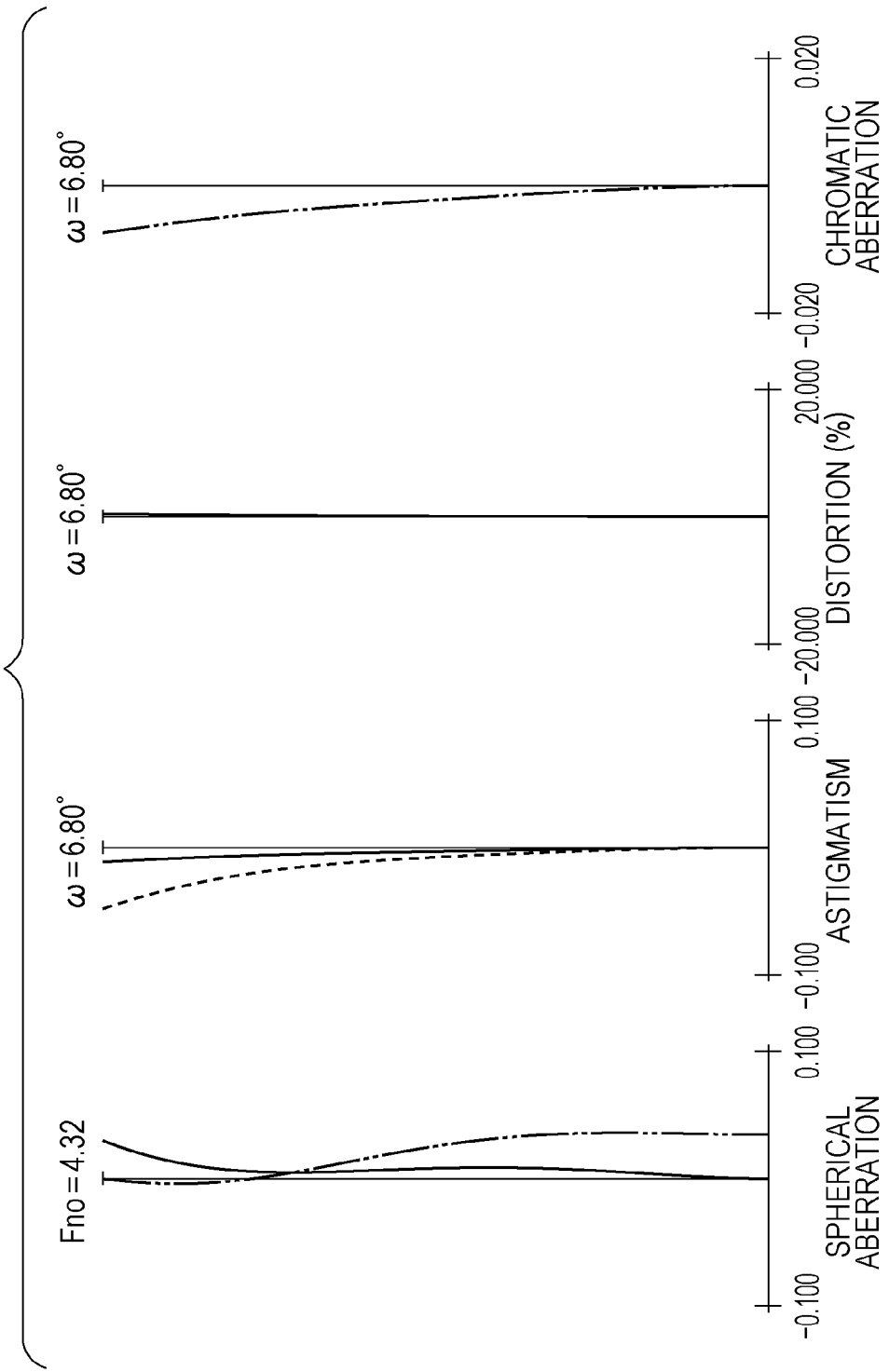

ZOOM LENS AND IMAGE PICKUP APPARATUS EQUIPPED WITH THE ZOOM LENS

BACKGROUND OF THE INVENTION

1. Field of the Invention

The present invention relates to a zoom lens and an image pickup apparatus equipped with the zoom lens, and more specifically, it is suitable for a digital still camera, a video camera, a TV camera, a surveillance camera, a silver-halide film camera, and the like.

2. Description of the Related Art

In recent years, an image taking optical system used in an image pickup apparatus such as a digital camera or a video camera has been required to be a compact zoom lens having a high zoom ratio, a wide angle of view, and a high resolution. An image taking optical system used in a digital still camera has been required to record not only still images but also movies and to be a high-optical-performance yet compact lens system.

A positive-lead type zoom lens having a lens unit of positive refractive power disposed closest to the object is known as a compact and high-zoom-ratio zoom lens. As a positive-lead type zoom lens, there is known a four-unit zoom lens including, in order from the object side, first to fourth lens units of positive, negative, positive, and positive refractive powers, wherein each lens unit moves during zooming, and focusing is performed by the fourth lens unit (see Japanese Patent Laid-Open No. 2007-47538 and U.S. Pat. No. 7,944,622).

As a positive-lead type zoom lens, there is known a five-unit zoom lens system including, in order from the object side, first to fifth lens units of positive, negative, positive, negative, and positive refractive powers (U.S. Pat. No. 7,304,805).

It is relatively easy to increase the zoom ratio of a positive-lead type zoom lens while downsizing the entire system thereof. In order to downsize the entire system of a positive-lead type zoom lens while ensuring a predetermined zoom ratio, it is recommended to reduce the number of lenses while increasing the refractive powers of lens units constituting the zoom lens. However, in such a zoom lens, the lens thicknesses increase with increase in refractive power of lens surfaces. As a result, the downsizing of the entire lens system becomes insufficient, and aberrations often occur.

In an image pickup apparatus whose lens units are retracted when not in use, errors such as inclination of lenses and lens units are inevitably large due to the mechanical structure. If the lenses and the lens units are sensitive, the optical performance degrades and image shake occurs during zooming.

For this reason, it is necessary to minimize the sensitivities of the lens and the lens units to obtain high optical performance. In the above-described positive-lead-type four-unit or five-unit zoom lens system, it is important to appropriately set each component of the zoom lens to obtain high optical performance while downsizing the entire system and increasing the zoom ratio. For example, it is important to appropriately set the zoom type (the number of lens units and the refractive power of each lens unit), the movement locus of each lens unit during zooming, and the share of zoom ratio of each lens unit.

In particular, it is important to appropriately set the lens configuration and the refractive power of the first lens unit, and the share of zoom ratio of the second lens unit for magnification variation.

If these are not appropriate, the size of the entire system increases when the zoom ratio is increased, the variation in aberrations during zooming increases, and it is very difficult to obtain high optical performance throughout the zoom range and throughout the viewing area.

SUMMARY OF THE INVENTION

The present invention provides a zoom lens having a compact lens system and a high zoom ratio, and an image pickup apparatus equipped with the zoom lens.

In an aspect of the present invention, a zoom lens includes, in order from an object side to an image side, a first lens unit of positive refractive power, a second lens unit of negative refractive power, a third lens unit of positive refractive power, and a rear lens group having one or more lens units. During zooming from a wide-angle end to a telephoto end, the distance between the first lens unit and the second lens unit increases, the distance between the second lens unit and the third lens unit decreases, and the distance between the third lens unit and the rear lens group changes. The first lens unit consists of, in order from the object side to the image side, a positive lens and a negative lens. The following conditional expressions are satisfied:

$$8.0 < f1/fW < 30.0 \text{ and}$$

$$2.0 < \beta 2T/\beta 2W < 10.0,$$

where f1 is the focal length of the first lens unit, fW is the focal length of the entire system at the wide-angle end, and $\beta 2W$ and $\beta 2T$ are respectively the lateral magnifications of the second lens unit at the wide-angle end and the telephoto end.

Further features of the present invention will become apparent from the following description of exemplary embodiments with reference to the attached drawings.

BRIEF DESCRIPTION OF THE DRAWINGS

FIGS. 2A, 2B, 2C, and 2D are aberration diagrams of the zoom lens of Embodiment 1 at the wide-angle end, the first middle zooming position, the second middle zooming position, and the telephoto end, respectively.

FIGS. 3A, 3B, 3C, and 3D are lens sectional views of a zoom lens of Embodiment 2 at the wide-angle end, a first middle zooming position, a second middle zooming position, and the telephoto end, respectively.

FIGS. 4A, 4B, 4C, and 4D are aberration diagrams of the zoom lens of Embodiment 2 at the wide-angle end, the first middle zooming position, the second middle zooming position, and the telephoto end, respectively.

FIGS. 5A, 5B, 5C, and 5D are lens sectional views of a zoom lens of Embodiment 3 at the wide-angle end, a first middle zooming position, a second middle zooming position, and the telephoto end, respectively.

FIGS. 6A, 6B, 6C, and 6D are aberration diagrams of the zoom lens of Embodiment 3 at the wide-angle end, the first middle zooming position, the second middle zooming position, and the telephoto end, respectively.

DESCRIPTION OF THE EMBODIMENTS

Embodiments of the present invention will be described in detail with reference to the drawings. The zoom lens of the present invention has, in order from the object side to the image side, a first lens unit of positive refractive power (optical power=the reciprocal of the focal length), a second lens unit of negative refractive power, a third lens unit of positive refractive power, and a rear lens group having one or more lens units.

During zooming from the wide-angle end to the telephoto end, the first lens unit moves to the object side or in a locus convex toward the image side. The second lens unit moves in a locus convex toward the image side. The third lens unit moves to the object side. At this time, the first to third lens units move such that the distance between the first lens unit and the second lens unit at the telephoto end is larger than that at the wide-angle end (the distance between the first lens unit and the second lens unit increases), the distance between the second lens unit and the third lens unit at the telephoto end is smaller than that at the wide-angle end (the distance between the second lens unit and the third lens unit decreases), and the distance between the third lens unit and the rear lens group changes.

FIGS. 1A, 1B, 1C, and 1D are lens sectional views of a zoom lens of Embodiment 1 of the present invention at the wide-angle end (short focal length end), a first middle zooming position, a second middle zooming position, and the telephoto end (long focal length end), respectively. FIGS. 2A, 2B, 2C, and 2D are aberration diagrams of the zoom lens of Embodiment 1 at the wide-angle end, the first middle zooming position, the second middle zooming position, and the telephoto end, respectively. Embodiment 1 is a zoom lens having a zoom ratio of 9.40 and an aperture ratio of about 2.74 to about 5.60.

FIGS. 3A, 3B, 3C, and 3D are lens sectional views of a zoom lens of Embodiment 2 of the present invention at the wide-angle end, a first middle zooming position, a second middle zooming position, and the telephoto end, respectively. FIGS. 4A, 4B, 4C, and 4D are aberration diagrams of the zoom lens of Embodiment 2 at the wide-angle end, the first middle zooming position, the second middle zooming position, and the telephoto end, respectively. Embodiment 2 is a zoom lens having a zoom ratio of 11.32 and an aperture ratio of about 2.65 to about 5.60.

FIGS. 5A, 5B, 5C, and 5D are lens sectional views of a zoom lens of Embodiment 3 of the present invention at the wide-angle end, a first middle zooming position, a second middle zooming position, and the telephoto end, respectively. FIGS. 6A, 6B, 6C, and 6D are aberration diagrams of the zoom lens of Embodiment 3 at the wide-angle end, the first middle zooming position, the second middle zooming position, and the telephoto end, respectively. Embodiment 3 is a zoom lens having a zoom ratio of 14.76 and an aperture ratio of about 2.42 to about 5.60.

Figure 1A:
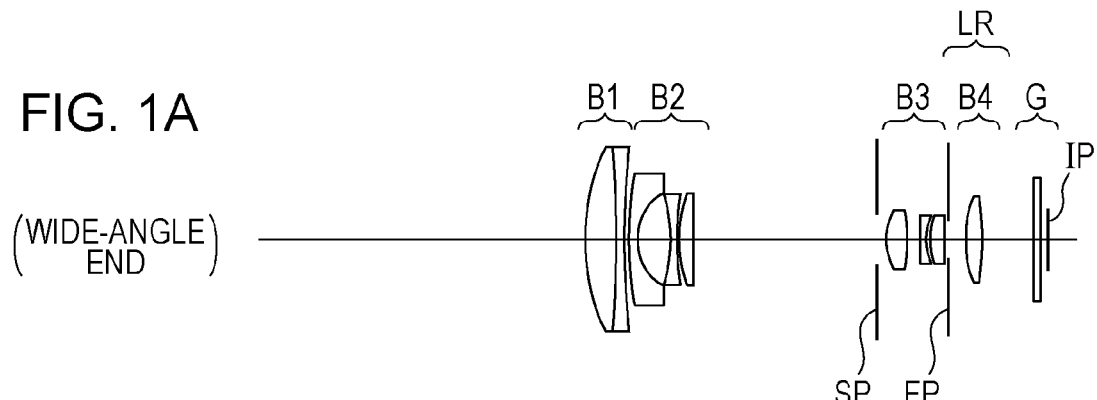
FIGS. 1A, 1B, 1C, and 1D are lens sectional views of a zoom lens of Embodiment 1 at the wide-angle end, a first middle zooming position, a second middle zooming position, and the telephoto end, respectively.
Figure 1B:
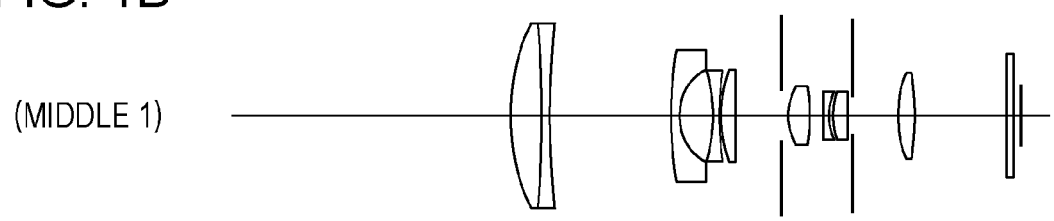
Figure 1C:
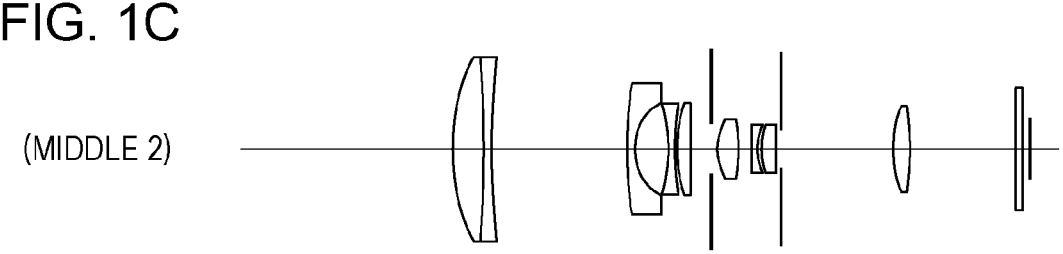
Figure 1D:
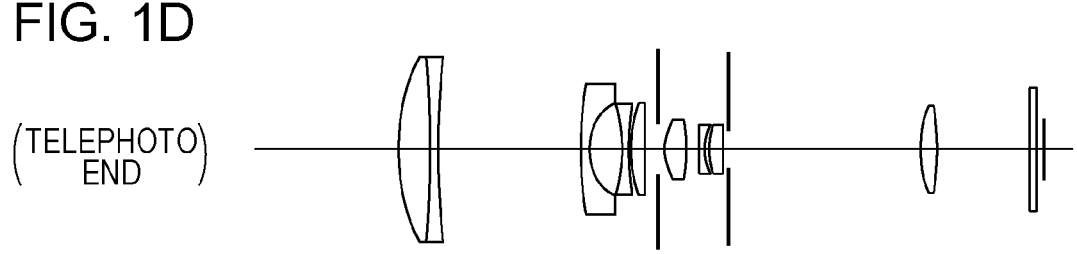
Figure 4B:
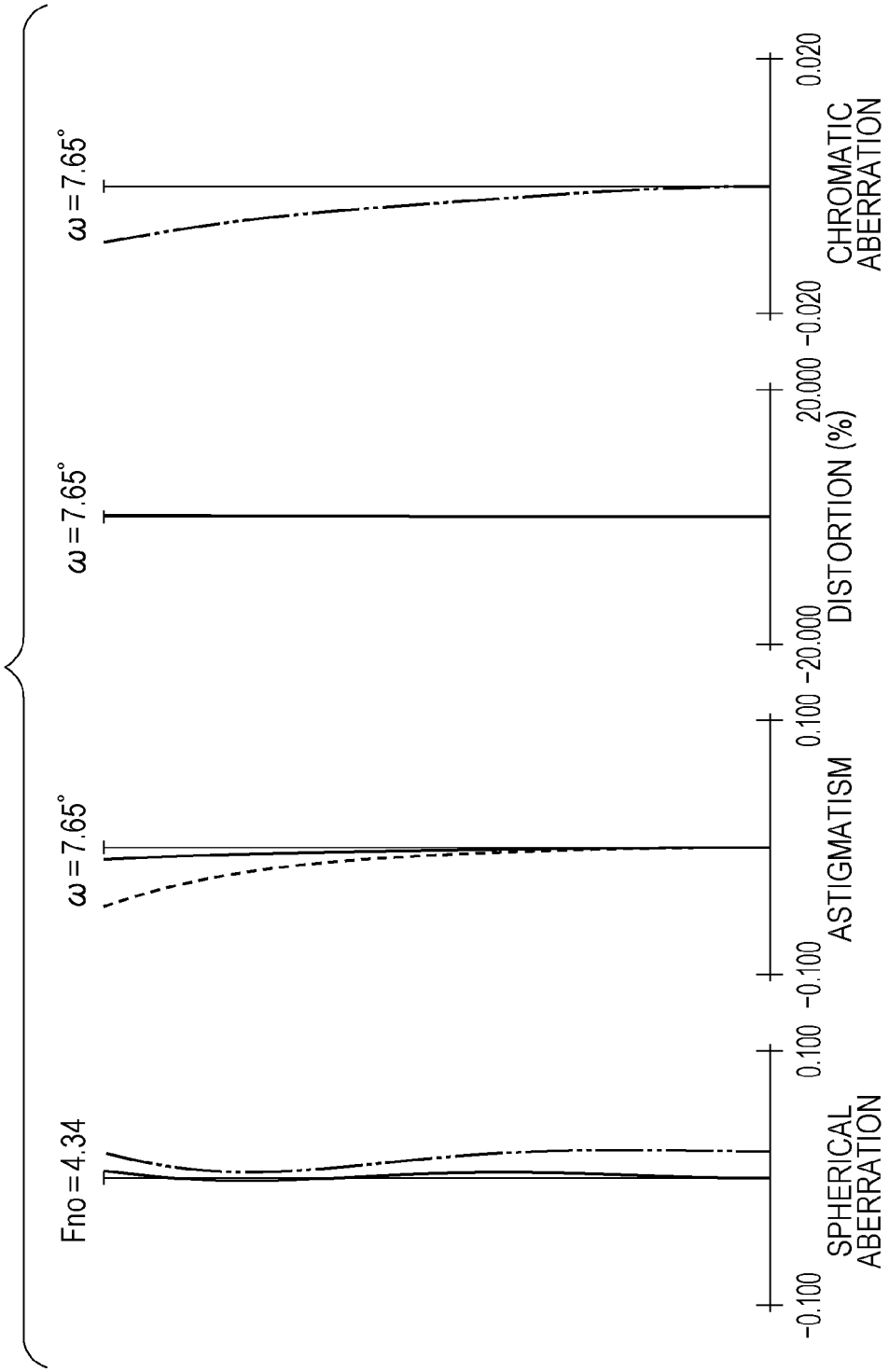
Figure 6D:
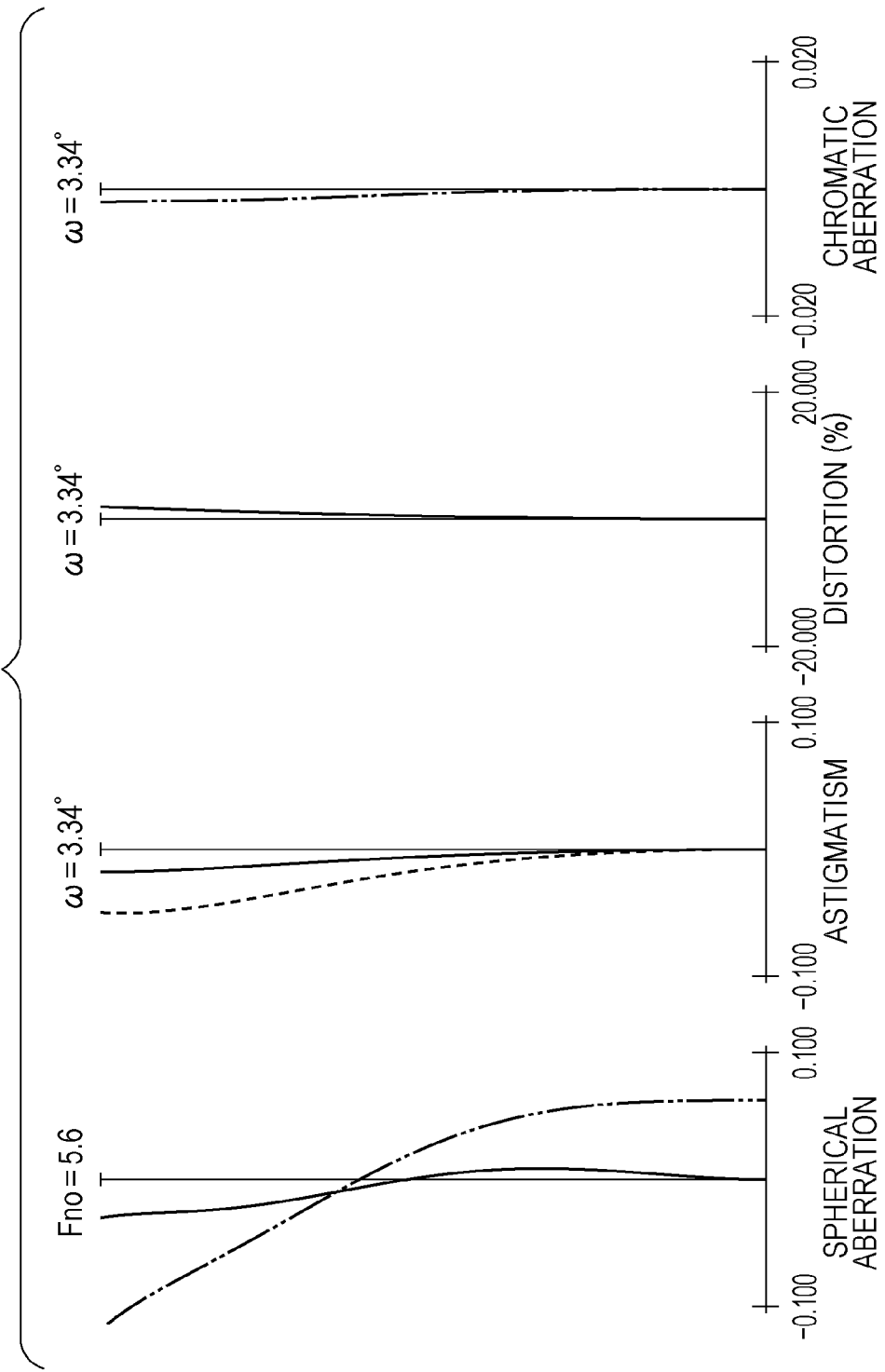
Figure 7:
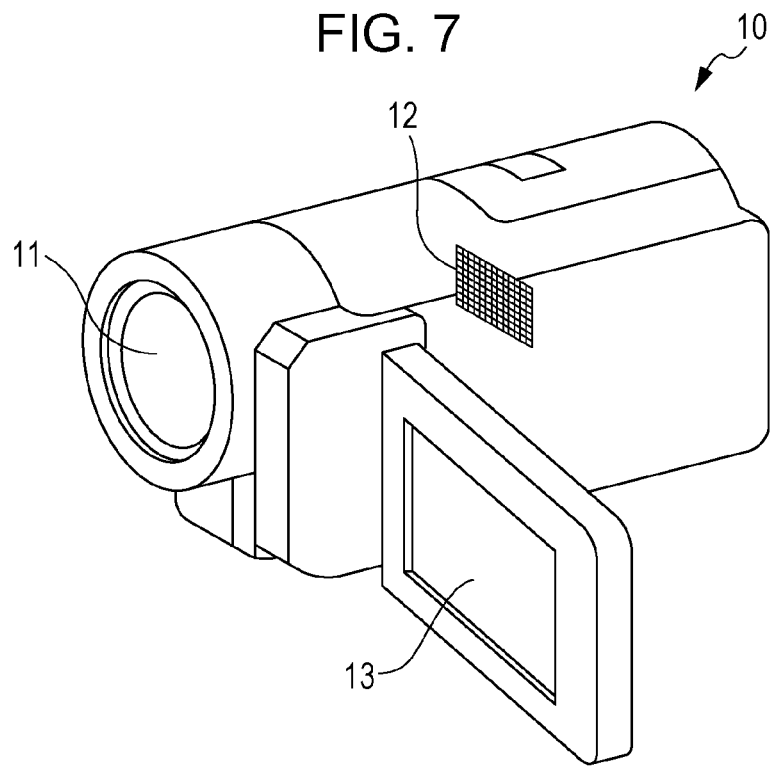
FIG. 7 is a schematic view of an image pickup apparatus of the present invention.
Figure 8:
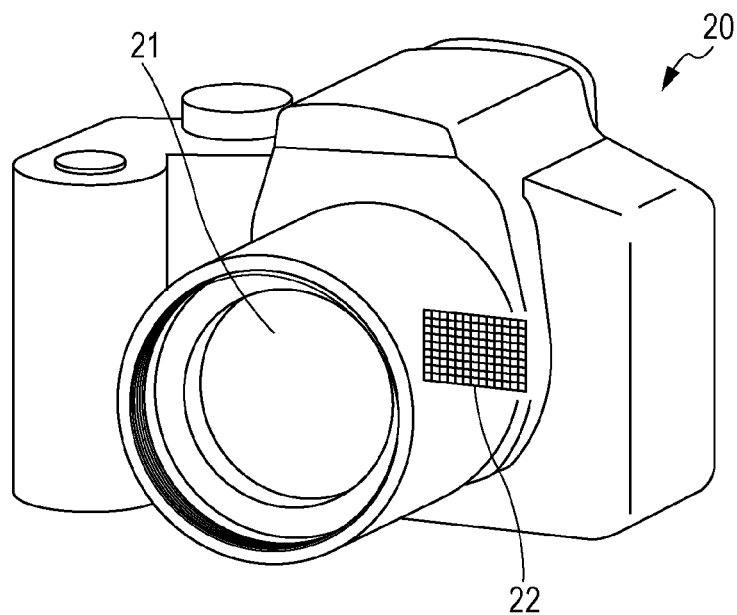
FIG. 8 is a schematic view of an image pickup apparatus of the present invention.

FIG. 7 is a schematic view of a video camera (image pickup apparatus) having a zoom lens of the present invention. FIG. 8 is a schematic view of a digital still camera (image pickup apparatus) having a zoom lens of the present invention.

Figure 9:
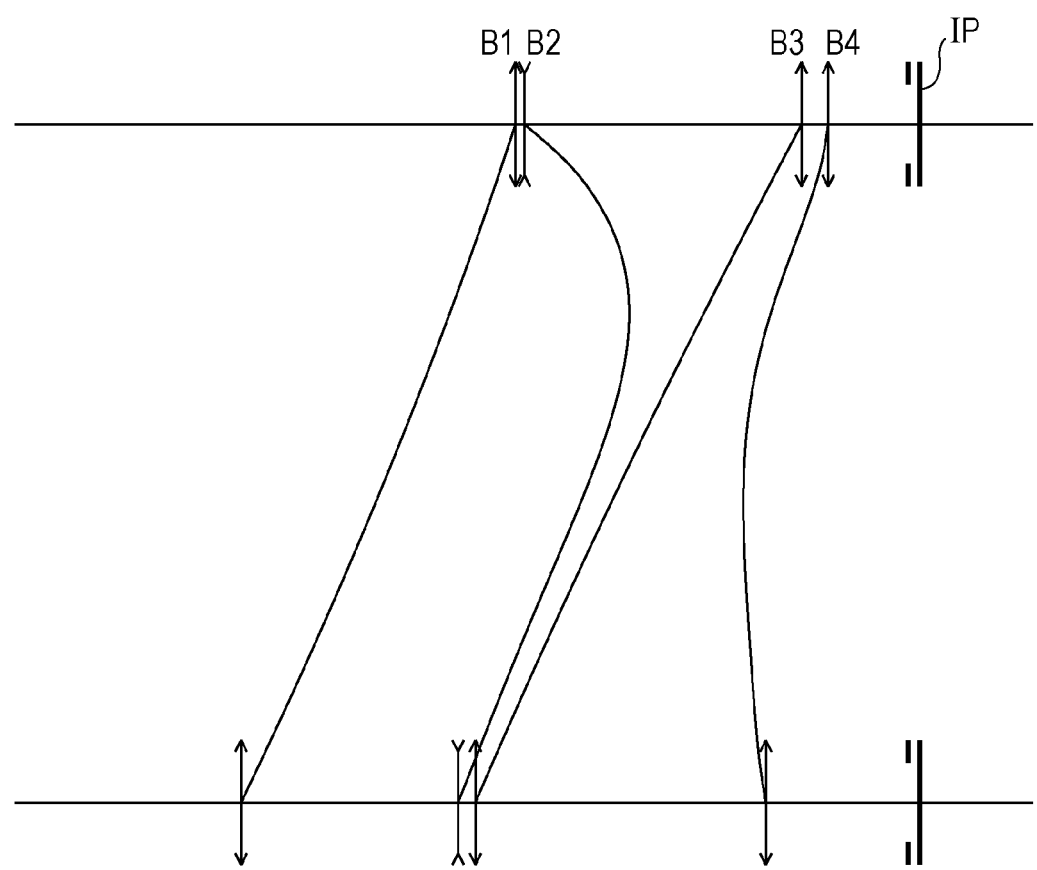
FIG. 9 illustrates the zoom loci of the lens units of Embodiment 1 of the present invention.
Figure 10:
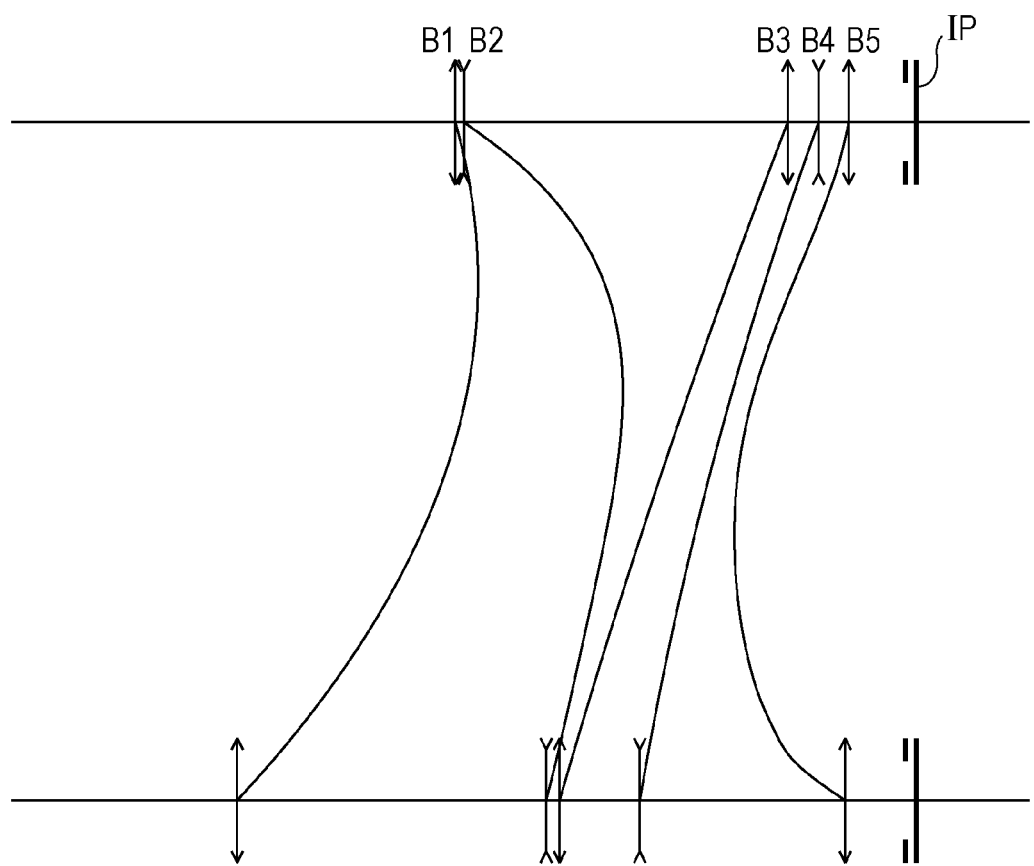
FIG. 10 illustrates the zoom loci of the lens units of Embodiment 2 of the present invention.
Figure 11:
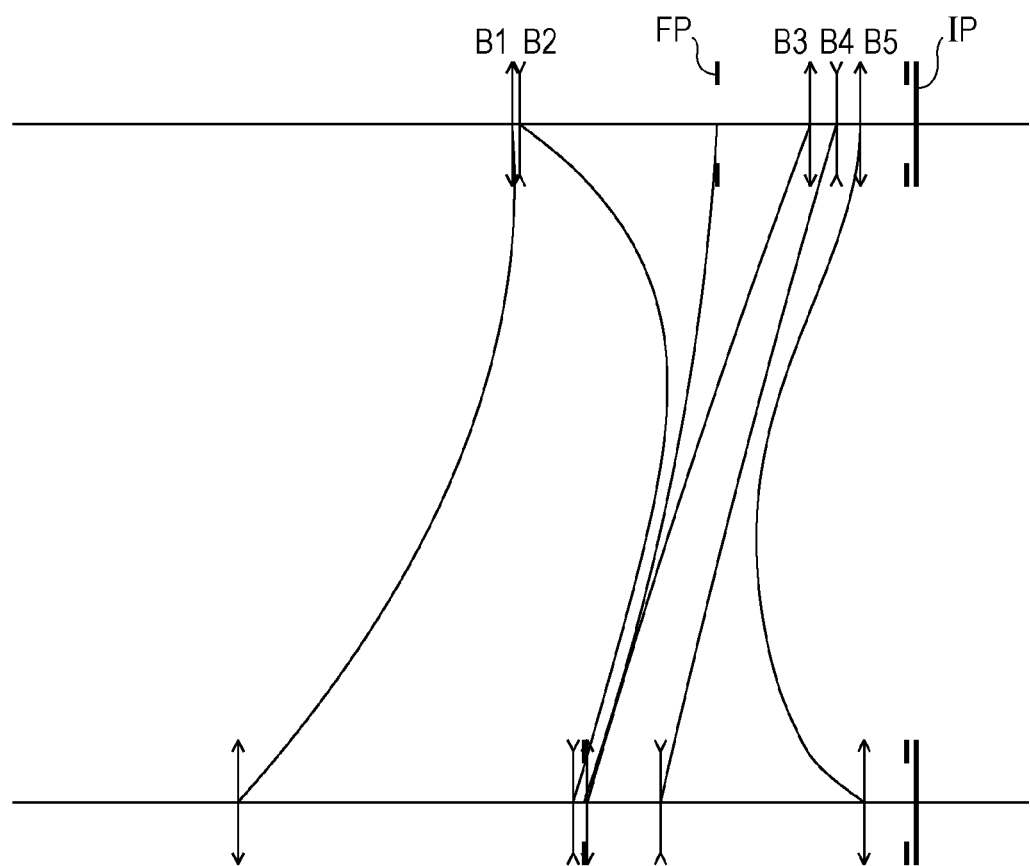
FIG. 11 illustrates the zoom loci of the lens units of Embodiment 3 of the present invention.

FIGS. 9 to 11 show the movement loci of the lens units and the flare-cut stop during zooming from the wide-angle end to the telephoto end in Embodiments 1 to 3 of the present invention.

The zoom lens of each embodiment is an image taking optical system used in an image pickup apparatus such as a video camera, a digital still camera, a silver-halide film camera, or a TV camera. The zoom lens of each embodiment can also be used as a projection optical system for a projection apparatus (projector). In the lens sectional views, the left side is the object side (the front side), and the right side is the image side (the rear side). In the lens sectional views, Bi denotes the i-th lens unit from the object side. LR denotes a rear lens group having one or more lens units.

SP denotes an aperture stop that determines (restricts) the light beam of the open F-number (Fno). FP denotes a flare-cut stop that does not require an aperture diameter. The flare-cut stop cuts unwanted light. G denotes an optical block corresponding to an optical filter, a face plate, an optical low-pass filter, an infrared cut filter, or the like. IP denotes an image plane.

When the zoom lens is used as an image taking optical system of a video camera or a digital camera, the image plane IP corresponds to the image pickup plane of a solid-state image pickup device (photoelectric conversion device) such as a CCD sensor or a CMOS sensor. When the zoom lens is used as an image taking optical system of a silver-halide film camera, the image plane IP corresponds to the film plane. The arrows show the movement loci of the lens units during zooming (magnification variation) from the wide-angle end to the telephoto end.

In the aberration diagrams, Fno denotes the F-number, and ω denotes the half angle of view (degree), the angle of view obtained by ray tracing. In the spherical aberration diagrams, the solid line represents the d-line (wavelength 587.6 nm), and the long dashed double-short dashed line represents the g-line (wavelength 435.8 nm).

In the astigmatism diagrams, the solid line and the dotted line represent the sagittal image plane and the meridional image plane, respectively. The distortion is for the d-line. In the lateral chromatic aberration diagrams, the long dashed double-short dashed line represents the g-line. In each of the following embodiments, the wide-angle end and the telephoto end refer to the zooming positions where the lens units for magnification variation are located at either end of their mechanically movable ranges on the optical axis.

Each embodiment is a zoom lens having, in order from the object side to the image side, a first lens unit B1 of positive refractive power, a second lens unit B2 of negative refractive power, a third lens unit B3 of positive refractive power, and a rear lens group LR having one or more lens units.

During zooming from the wide-angle end to the telephoto end, the first lens unit B1 moves to the object side, or in a locus convex toward the image side. The second lens unit B2 moves in a locus convex toward the image side. The third lens unit B3 moves to the object side. The lens units move such that the distance between the first lens unit B1 and the second lens unit B2 at the telephoto end is larger than that at the wide-angle end, the distance between the second lens unit B2 and the third lens unit B3 at the telephoto end is smaller than that at the wide-angle end, and the distance between the third lens unit B3 and the rear lens group LR at the telephoto end is larger than that at the wide-angle end. This facilitates the increase in the zoom ratio.

In Embodiment 1, the rear lens group LR includes a fourth lens unit B4 of positive refractive power that moves during zooming.

In Embodiments 2 and 3, the rear lens group LR includes a fourth lens unit B4 of negative refractive power and a fifth lens unit B5 of positive refractive power that move during zooming. However, in each embodiment, the number of lens units constituting the rear lens group LR can be any number greater than or equal to one.

In Embodiment 1 (FIG. 1 and FIG. 9), the aperture stop SP and the flare-cut stop FP move integrally with the third lens unit B3 during zooming.

In Embodiment 2 (FIG. 3 and FIG. 10), the aperture stop SP moves integrally with the third lens unit B3 during zooming. In Embodiment 3 (FIG. 5 and FIG. 11), the flare-cut stop FP and the aperture stop SP both move to the object side while reducing the distance therebetween during zooming from the wide-angle end to the telephoto end.

In Embodiment 3, by providing a flare-cut stop FP that moves during zooming, between the second lens unit B2 and the aperture stop SP, the flare of the lower ray is effectively removed on the wide-angle side. In addition, steep decline in light quantity ratio of the periphery of the viewing area due to zooming is eased.

In the zoom lens in each embodiment, by increasing the refractive powers of the first lens unit B1 and the second lens unit B2 to some extent, the distance between the first lens unit B1 and the aperture stop SP is reduced at the wide-angle end. Thereby the lens effective diameter of the first lens unit B1 is reduced. By increasing the refractive power of the third lens unit B3 to some extent, the distance from the aperture stop SP to the image plane IP is reduced. Thereby the lens overall length is reduced at the wide-angle end.

In the zoom lens of each embodiment, during zooming from the wide-angle end to the telephoto end, the first lens unit B1 is moved to the object side, or in a locus convex toward the image side. By making the distance between the first lens unit B1 and the second lens unit B2 at the telephoto end larger than that at the wide-angle end, magnification variation is performed.

During zooming from the wide-angle end to the telephoto end, the third lens unit B3 is moved to the object side, and the distance between the second lens unit B2 and the third lens unit B3 at the telephoto end is made smaller than that at the wide-angle end, and thereby a magnification-varying action is performed. By sharing the magnification-varying action among a plurality lens units: the first lens unit B1 and the third lens unit B3, the movement stroke in zooming is reduced while achieving a higher zoom ratio, as well as reducing the lens overall length (the distance from the first lens surface to the image plane) at the telephoto end. Focusing from an object at infinity to a near object moves the final lens unit to the object side.

By configuring as above, the lens overall length is reduced and the zoom ratio is increased at the wide-angle end and the telephoto end. In each embodiment, any lens unit may be moved so as to have a component perpendicular to the optical axis and thereby image blur when the zoom lens vibrates may be corrected. For example, by moving the third lens unit B3 such that it has a component perpendicular to the optical axis, the image blur when the entire optical system vibrates (tilts) may be corrected.

In each embodiment, the first lens unit B1 consists of, in order from the object side to the image side, a positive lens and a negative lens. The focal length of the first lens unit B1 will be denoted by f1, and the focal length of the entire system at the wide-angle end will be denoted by fW. The lateral magnifications of the second lens unit B2 at the wide-angle end and the telephoto end will be denoted by $\beta 2W$ and $\beta 2T$, respectively. The following conditional expressions (1) and (2) are satisfied:

$$8.0 < f1/fW < 30.0 \tag{1}$$

and $$2.0 < \beta 2T/\beta 2W < 10.0 \tag{2}.$$

In order to ensure a high zoom ratio and to satisfactorily correct aberrations, each embodiment has lens units of positive, negative, and positive refractive powers in order from the object side to the image side.

In addition, the first lens unit B1 includes, in order from the object side to the image side, a positive lens and a negative lens, and thereby the spherical aberration is satisfactorily corrected on the telephoto side. In particular, the dispersion of the spherical aberration of each wavelength is suppressed. In addition, the lens overall length (the distance from the first lens surface to the image plane) is reduced at the telephoto end.

The conditional expression (1) specifies the focal length of the first lens unit B1 based on the focal length of the entire system at the wide-angle end.

If the focal length of the first lens unit B1 increases beyond the upper limit of the conditional expression (1), increasing the zoom ratio increases the moving distance of the first lens unit B1 and increases the lens overall length at the telephoto end. This is undesirable.

If the focal length of the first lens unit B1 decreases beyond the lower limit of the conditional expression (1), the longitudinal chromatic aberration increases on the telephoto side, and the curvature of field increases on the wide-angle side. This is undesirable.

The conditional expression (2) specifies the range of magnification-varying ratio of the second lens unit B2 during zooming from the wide-angle end to the telephoto end. If the share of zoom ratio of the second lens unit B2 increases beyond the upper limit of the conditional expression (2), the size of the first lens unit B1 increases. In addition, the image plane variation increases during zooming. This is undesirable. If the share of zoom ratio of the second lens unit B2 decreases beyond the lower limit of the conditional expression (2), it becomes difficult to increase the zoom ratio and to downsize the entire system.

By configuring as above, according to each embodiment, a zoom lens in which aberrations such as spherical aberration and coma aberration can be satisfactorily corrected and high optical performance can be easily obtained can be made. In each embodiment, it is more desirable that one or more of the following conditional expressions be satisfied.

The lens overall length (the length from the first lens surface to the image plane) at the wide-angle end will be denoted by TDW, and the distance between the second lens unit B2 and the third lens unit B3 at the wide-angle end will be denoted by L23W. The curvature radii of the object-side and image-side lens surfaces of the positive lens of the first lens unit B1 will be denoted by R1a and R1b, respectively. The focal length of the positive lens of the first lens unit B1 will be denoted by f1p. When the positive lens and the negative lens of the first lens unit B1 are cemented together into a cemented lens, the curvature radius of the cemented lens surface of the cemented lens will be denoted by R2. The focal length of the entire system at the telephoto end will be denoted by fT, and the focal length of the second lens unit B2 will be denoted by f2.

The refractive index of the material for the positive lens of the first lens unit B1 will be denoted by Nd1p. The Abbe numbers of the materials for the positive lens and the negative lens of the first lens unit B1 will be denoted by vd1p and vd1n, respectively. It is desirable that one or more of the following conditional expressions be satisfied:

$$0.45 < L23W/TDW < 0.80 \tag{3},$$

$$-0.9 < (R1a+R1b)/(R1a-R1b) < 0.5 \tag{4},$$

$$0.4 < f1p/f1 < 0.8 \tag{5},$$

$$-10.0 < R2/f1 < -0.2 \tag{6},$$

$$0.4 < |f2|/\sqrt{(fW \times fT)} < 0.7 \tag{7},$$

$$0.7 < f1/fT < 1.2 \tag{8},$$

$$1.6 < Nd1p < 2.5 \tag{9}, \text{ and}$$

$$1.5 < \nu d1p/\nu d1n < 4.0 \tag{10}.$$

Next, the technical meanings of the above conditional expressions will be described. The conditional expression (3) specifies the distance between the second lens unit B2 and the third lens unit B3 at the wide-angle end based on the lens overall length at the wide-angle end.

If the lens overall length at the wide-angle end decreases beyond the upper limit of the conditional expression (3), it becomes difficult to keep the Petzval sum at an appropriate level, and the curvature of field increases. This is undesirable. In addition, it becomes difficult to increase the zoom ratio while satisfactorily suppressing the spherical aberration, coma aberration, and the like. If the distance between the second lens unit B2 and the third lens unit B3 increases beyond the lower limit of the conditional expression (3), it becomes easy to correct the curvature of field, coma aberration, and the like, but the effective diameter of each lens increases. This is undesirable.

The conditional expression (4) is for appropriately setting the shape factor of the positive lens constituting the first lens unit B1, satisfactorily correcting the curvature of field throughout the zoom region from the wide-angle end to the telephoto end, and satisfactorily correcting the spherical aberration and longitudinal chromatic aberration at the telephoto end. If the upper limit of the conditional expression (4) is exceeded, the correction effect for spherical aberration decreases on the telephoto side. If the lower limit of the conditional expression (4) is exceeded, it becomes difficult to correct the curvature of field on the wide-angle side and the spherical aberration on the telephoto side in a balanced manner.

The conditional expression (5) specifies the focal length of the positive lens constituting the first lens unit B1 based on the focal length of the first lens unit B1. If the focal length of the first lens unit B1 decreases beyond the upper limit of the conditional expression (5), it becomes easy to reduce the lens overall length at the telephoto end, but it becomes difficult to suppress the occurrence of coma aberration.

If the focal length of the first lens unit B1 increases beyond the lower limit of the conditional expression (5), the lens overall length increases on the telephoto side. In each embodiment, it is desirable that the positive lens and the negative lens of the first lens unit B1 be cemented together into a cemented lens. In this case, the sensitivity of decentration coma aberration caused by the error in relative positions of the cemented lens surfaces can be reduced.

The conditional expression (6) normalizes the curvature radius of the cemented lens surfaces of the first lens unit B1 in this case by the focal length of the first lens unit B1. The conditional expression (6) is for reducing the effective diameter of the front lens (the first lens) and downsizing while suppressing the spherical aberration at each wavelength on the telephoto side.

If the focal length of the first lens unit B1 increases beyond the upper limit of the conditional expression (6), it becomes difficult to correct the spherical aberration on the telephoto side, and it becomes difficult to reduce the lens overall length. If the curvature radius of the cemented lens surfaces of the first lens unit B1 increases beyond the lower limit of the conditional expression (6), it becomes difficult to reduce the front lens effective diameter and to suppress the spherical aberration, coma aberration, and the like (particularly in the wavelength region of 400 to 450 nm) on the telephoto side.

The conditional expression (7) specifies the focal length of the second lens unit B2 based on the focal length of a middle zooming position. If the focal length of the second lens unit B2 increases beyond the upper limit of the conditional expression (7), it becomes difficult to increase the zoom ratio and to reduce the lens overall length. In addition, retrofocus refractive-power arrangement on the wide-angle side becomes difficult, and thus it becomes difficult to correct the curvature of field and the astigmatism on the wide-angle side. If the focal length of the second lens unit B2 decreases beyond the lower limit of the conditional expression (7), it becomes easy to increase the zoom ratio, but the Petzval sum increases in the negative direction, and the curvature of field increases.

The conditional expression (8) specifies the focal length of the first lens unit B1 based on the focal length of the entire system at the telephoto end. If the focal length of the first lens unit B1 increases beyond the upper limit of the conditional expression (8), it becomes difficult to reduce the lens overall length while increasing the zoom ratio. If the focal length of the first lens unit B1 decreases beyond the lower limit of the conditional expression (8), it becomes easy to reduce the lens overall length and to increase the zoom ratio, but it becomes difficult to correct the curvature of field and the astigmatism throughout the zoom region.

The conditional expression (9) relates to the refractive index of the material for the positive lens of the first lens unit B1. If the refractive index of the material for the positive lens decreases beyond the lower limit of the conditional expression (9), the curvature radius of the lens surface decreases in order for the positive lens to have a predetermined refractive power, and the variation in spherical aberration and coma aberration increases during zooming. In addition, it becomes difficult to reduce the thickness of the first lens unit. If the refractive index of the material for the positive lens increases beyond the upper limit of the conditional expression (9), the curvature radius of the lens surface increases, and it becomes difficult to obtain the correction effect for aberrations.

The conditional expression (10) relates to the Abbe numbers of the positive lens and the negative lens constituting the first lens unit B1. If the ratio between Abbe numbers increases beyond the upper limit of the conditional expression (10), the power of the cemented lens surfaces of the first lens unit B1 decreases, and it becomes difficult to correct the angle-of-view variation of coma aberration while correcting the variation in longitudinal chromatic aberration in a balanced manner during zooming. If the ratio between Abbe numbers decreases beyond the lower limit of the conditional expression (10), the power of the cemented lens surfaces increases for achromatism of the first lens unit B1, and the correction of aberrations becomes difficult.

In each embodiment, it is more desirable that the numerical ranges of the conditional expressions (1) to (10) be set as follows:

$$8.4 < f1/fW < 24.0 \tag{1a},$$

$$2.0 < \beta 2T/\beta 2W < 8.0 \tag{2a},$$

$$0.45 < L23W/TDW < 0.60 \tag{3a},$$

$$0.8 < (R1a+R1b)/(R1a-R1b) < 0.3 \tag{4a},$$

$$0.5 < f1p/f1 < 0.8 \tag{5a},$$

$$-8.0 < R2/f1 < -1.0 \tag{6a},$$

$0.4<|f2|/\sqrt{(fW \times fT)}<0.6$ (7a), $0.8<f1/fT<1.2$ (8a), $1.65<Nd1p<2.20$ (9a), and $1.8<vd1p/vd1n<3.5$ (10a).

It is more desirable that the numerical ranges of the conditional expressions (1a) to (10a) be set as follows:

$8.8<f1/fW<18.0$ (1b), $2.2<\beta 2T/\beta 2W<5.0$ (2b), $0.45<L23W/TDW<0.55$ (3b), $-0.8<(R1a+R1b)/(R1a-R1b)<0.0$ (4b), $0.55<f1p/f1<0.75$ (5b), $-6.0<R2/f1<-1.1$ (6b), $0.5<|f2|/\sqrt{(fW \times fT)}<0.6$ (7b), $0.9<f1/fT<1.1$ (8b), $1.75<Nd1p<2.00$ (9b), and $2.0<vd1p/vd1n<3.0$ (10b).

It is desirable that the third lens unit B3 have at least one aspherical surface. In order to make the F-number relatively small at the wide-angle end and to simplify the lens configuration of the lens unit of the rear lens group LR, it is desirable that the third lens unit B3 have at least one aspherical surface.

As described above, according to each embodiment, by appropriately setting the lens configuration of each lens unit and the share of zoom ratio by power distribution, a zoom lens that has a high zoom ratio and high imaging performance is obtained.

Next, an embodiment of a camcorder (video camera) and an embodiment of a digital still camera will be described with reference to FIG. 7 and FIG. 8, respectively, as image pickup apparatuses employing the zoom lens of each embodiment as an image taking optical system.

In FIG. 7, reference numeral 10 denotes a main body of a camera, and reference numeral 11 denotes an image taking optical system that is the zoom lens according to any one of Embodiments 1 to 3. Reference numeral 12 denotes a solid-state image pickup device (photoelectric conversion device), such as a CCD sensor or a CMOS sensor, that is housed in the main body of the camera and that detects an object image formed by the image taking optical system 11. Reference numeral 13 denotes a finder that is, for example, a liquid crystal display panel and that is used for observing an object image formed on the solid-state image pickup device 12.

In FIG. 8, reference numeral 20 denotes a main body of a camera, and reference numeral 21 denotes an image taking optical system that is the zoom lens according to any one of Embodiments 1 to 3. Reference numeral 22 denotes a solid-state image pickup device (photoelectric conversion device), such as a CCD sensor or a CMOS sensor, that is housed in the main body of the camera and that detects an object image formed by the image taking optical system 21.

The following are Numerical Embodiments 1 to 3 corresponding to Embodiments 1 to 3. In each numerical embodiment, surface number "i" is counted from the object side; ri denotes the curvature radius of the i-th optical surface (i-th surface); di denotes the axial distance between the i-th surface and the (i+1)th surface; and ndi and vdi denote the refractive index and the Abbe number, respectively, of the material for the i-th optical member for the d-line.

The two most image-side surfaces correspond to a glass block G. An aspherical shape is defined by the following expression:

$$X = \frac{\frac{H^2}{R}}{1+\sqrt{1-(1+K)\left(\frac{H}{R}\right)^2}} + A4H^4 + A6H^6 + A8H^8 + A10H^{10}$$

where the optical axis direction is the X-axis direction, the direction perpendicular to the optical axis direction is the H-axis direction, the direction in which light travels is the positive direction, R is a paraxial curvature radius, K is a conic constant, and A4, A6, A8, and A10 are aspherical coefficients.

Asterisk means a surface having an aspherical shape. "e-x" means $10^{-x}$. BF denotes an air-conversion length of back-focus. Table 1 shows the relationship between the above-described conditional expressions and numerical embodiments. In each numerical embodiment, values of F-number, angle of view (degree), image height, lens overall length, and BF at four focal lengths at the wide-angle end, the first middle zooming position, the second middle zooming position, and the telephoto end are shown.

[numerical embodiment 1]
unit mm surface data

| surface number | r | d | nd | vd |
|---|---|---|---|---|
| 1 | 26.795 | 4.36 | 1.77250 | 49.6 |
| 2 | −108.450 | 1.00 | 1.84666 | 23.8 |
| 3 | 127.297 | (variable) | | |
| 4 | 96.083 | 0.90 | 1.88300 | 40.8 |
| 5 | 7.531 | 4.44 | | |
| 6 | −18.279 | 0.80 | 1.77250 | 49.6 |
| 7 | 39.018 | 0.40 | | |
| 8 | 21.058 | 1.81 | 1.92286 | 18.9 |
| 9 | −187.420 | (variable) | | |
| 10(aperture stop) | ∞ | 1.10 | | |
| 11* | 6.790 | 2.69 | 1.59201 | 67.0 |
| 12* | −28.893 | 1.90 | | |
| 13 | 47.938 | 0.70 | 1.84666 | 23.8 |
| 14 | 6.029 | 0.62 | | |
| 15 | 10.442 | 1.74 | 1.69895 | 30.1 |
| 16 | 101.799 | 0.60 | | |
| 17 | ∞ | (variable) | (flare-cut stop) | |
| 18 | 17.191 | 1.91 | 1.48749 | 70.2 |
| 19 | −400.000 | (variable | | |
| 20 | ∞ | 0.80 | 1.49831 | 65.1 |
| 21 | ∞ | 1.00 | | |
| image plane | ∞ | | | | aspherical surface data

11th surface

K = −1.10479e+000 A4 = 1.63437e−004 A6 = 6.23338e−007

12th surface

K = 0.00000e+000 A4 = 1.28365e−004 A6 = −9.92006e−007 various data
zoom ratio 9.40

| focal length | 5.12 | 22.93 | 36.86 | 48.09 |
|---|---|---|---|---|
| F-number | 2.74 | 3.79 | 4.73 | 5.60 |

[numerical embodiment 1]
unit mm

| | | | | |
|---|---|---|---|---|
| half angle of view | 39.64 | 9.59 | 6.02 | 4.62 |
| image height | 3.50 | 3.88 | 3.88 | 3.88 |
| lens overall length | 61.21 | 67.49 | 76.40 | 85.43 |
| BF | 8.63 | 14.08 | 15.90 | 14.13 |
| d3 | 0.80 | 16.28 | 18.12 | 19.15 |
| d9 | 24.44 | 5.98 | 2.36 | 1.53 |
| d17 | 2.36 | 6.17 | 15.02 | 25.63 |
| d19 | 7.09 | 12.54 | 14.37 | 12.60 | zoom lens unit data

| unit | starting surface | focal length |
|---|---|---|
| 1 | 1 | 45.21 |
| 2 | 4 | −8.30 |
| 3 | 10 | 15.02 |
| 4 | 18 | 33.86 |
| 5 | 20 | ∞ |

[numerical embodiment 2]
unit mm surface data

| surface number | r | d | nd | νd |
|---|---|---|---|---|
| 1 | 43.218 | 3.11 | 1.77250 | 49.6 |
| 2 | −65.629 | 1.00 | 1.84666 | 23.8 |
| 3 | −2530.897 | (variable) | | |
| 4 | −2443.275 | 0.90 | 1.88300 | 40.8 |
| 5 | 8.570 | 4.13 | | |
| 6 | −18.253 | 0.80 | 1.77250 | 49.6 |
| 7 | 133.250 | 0.40 | | |
| 8 | 27.389 | 1.79 | 1.92286 | 18.9 |
| 9 | −97.612 | (variable) | | |
| 10(aperture stop) | ∞ | 1.10 | | |
| 11* | 8.320 | 2.67 | 1.58313 | 59.4 |
| 12* | −40.347 | 1.81 | | |
| 13 | 27.061 | 0.70 | 1.80518 | 25.4 |
| 14 | 7.543 | 0.52 | | |
| 15 | 11.113 | 2.65 | 1.48749 | 70.2 |
| 16 | −14.108 | (variable) | | |
| 17 | −44.894 | 0.70 | 1.48749 | 70.2 |
| 18 | 10.778 | (variable) | | |
| 19 | 13.817 | 2.05 | 1.48749 | 70.2 |
| 20 | −401.060 | (variable) | | |
| 21 | ∞ | 0.80 | 1.49831 | 65.1 |
| 22 | ∞ | 1.00 | | |
| image plane | ∞ | | | | aspherical surface data

11th surface

K = −3.77863e−001 A4 = −6.45163e−005 A6 = 2.04530e−007
A8 = −1.44231e−008 A10 = 2.62605e−010

12th surface

K = 5.90971e−001 A4 = 1.74131e−004 A6 = −9.43102e−007 various data
zoom ratio 11.32

| | | | | |
|---|---|---|---|---|
| focal length | 5.14 | 28.80 | 43.81 | 58.22 |
| F-number | 2.66 | 4.34 | 4.89 | 5.60 |
| half angle of view | 40.08 | 7.65 | 5.05 | 3.81 |
| image height | 3.50 | 3.88 | 3.88 | 3.75 |
| lens overall length | 67.32 | 72.42 | 83.04 | 87.44 |
| BF | 6.72 | 17.14 | 12.73 | 7.05 |
| d3 | 0.80 | 18.17 | 25.32 | 28.49 |
| d9 | 29.84 | 2.81 | 1.47 | 1.23 |
| d16 | 2.84 | 5.26 | 6.82 | 7.40 |

[numerical embodiment 2]
unit mm

| | | | | |
|---|---|---|---|---|
| d18 | 2.79 | 4.71 | 12.38 | 18.94 |
| d20 | 5.19 | 15.60 | 11.19 | 5.51 | zoom lens unit data

| unit | starting surface | focal length |
|---|---|---|
| 1 | 1 | 58.48 |
| 2 | 4 | −9.64 |
| 4 | 10 | 12.49 |
| 5 | 17 | −17.76 |
| 6 | 19 | 27.44 |
| 7 | 21 | ∞ |

[numerical embodiment 3]
unit mm surface data

| surface number | r | d | nd | νd |
|---|---|---|---|---|
| 1 | 44.923 | 2.74 | 1.84300 | 53.9 |
| 2 | −337.606 | 1.00 | 1.94595 | 18.0 |
| 3 | 272.901 | (variable) | | |
| 4 | 154.746 | 0.90 | 1.85135 | 40.1 |
| 5* | 7.760 | 5.11 | | |
| 6 | −20.423 | 0.80 | 1.88300 | 40.8 |
| 7 | 58.169 | 0.40 | | |
| 8 | 26.569 | 2.11 | 1.92286 | 18.9 |
| 9 | −62.088 | (variable) | | |
| 10 | ∞ | (variable) | (flare-cut stop) | |
| 11(aperture stop) | ∞ | 0.50 | | |
| 12* | 8.524 | 2.63 | 1.58313 | 59.4 |
| 13* | −72.381 | 1.80 | | |
| 14 | 23.478 | 0.70 | 1.80518 | 25.4 |
| 15 | 7.651 | 0.33 | | |
| 16 | 10.417 | 2.49 | 1.48749 | 70.2 |
| 17 | −16.711 | (variable) | | |
| 18 | 54.045 | 0.70 | 1.48749 | 70.2 |
| 19 | 9.294 | (variable) | | |
| 20 | 12.782 | 2.07 | 1.49700 | 81.5 |
| 21 | −161.745 | 0.70 | 1.72825 | 28.5 |
| 22 | 178.244 | (variable) | | |
| 23 | ∞ | 0.80 | 1.49831 | 65.1 |
| 24 | ∞ | (variable) | | |
| image plane | ∞ | | | | aspherical surface data

5th surface

K = −1.20708e−001 A4 = −7.74415e−006

12th surface

K = −3.24251e−001 A4 = −6.10573e−005 A6 = 7.82703e−008
A8 = −1.44231e−008 A10 = 2.62605e−010

13th surface

K = 5.90971e−001 A4 = 1.41351e−004 A6 = −8.11089e−007 various data
zoom ratio 14.75

| | | | | |
|---|---|---|---|---|
| focal length | 4.41 | 16.02 | 32.38 | 65.06 |
| F-number | 2.42 | 3.32 | 4.32 | 5.60 |
| half angle of view | 44.84 | 13.52 | 6.80 | 3.34 |
| image height | 3.50 | 3.88 | 3.88 | 3.88 |
| lens overall length | 69.09 | 70.44 | 80.98 | 98.67 |
| BF | 6.53 | 12.65 | 17.56 | 6.12 |
| d3 | 0.80 | 17.58 | 25.28 | 36.17 |
| d9 | 21.32 | 3.77 | 1.41 | 1.16 |
| d10 | 10.06 | 4.32 | 0.60 | 0.36 |

-continued

[numerical embodiment 3]
unit mm

| | | | | |
|---|---|---|---|---|
| d17 | 2.82 | 4.47 | 6.35 | 7.91 |
| d19 | 2.58 | 2.66 | 4.80 | 21.97 |
| d22 | 4.99 | 11.11 | 16.03 | 4.59 |
| d24 | 1.00 | 1.00 | 1.00 | 1.00 | zoom lens unit data

| unit | starting surface | focal length |
|---|---|---|
| 1 | 1 | 66.08 |
| 2 | 4 | −9.19 |
| 3 | 10 | ∞ |
| 4 | 11 | 13.00 |
| 5 | 18 | −23.14 |
| 6 | 20 | 29.65 |
| 7 | 23 | ∞ |

TABLE 1

Values corresponding to conditional expressions in Embodiments

| | Embodiment 1 | Embodiment 2 | Embodiment 3 |
|---|---|---|---|
| fW | 5.118 | 5.144 | 4.409 |
| fT | 48.093 | 58.224 | 65.056 |
| f1 | 45.214 | 58.477 | 66.084 |
| f2 | −8.303 | −9.642 | −9.188 |
| f3 | 15.023 | 12.491 | 13.003 |
| f4 | 33.862 | −17.756 | −23.144 |
| f5 | — | 27.445 | 29.651 |
| β2W | −0.263 | −0.212 | −0.173 |
| β2T | −0.628 | −0.542 | −0.514 |
| β3W | −0.608 | −0.325 | −0.337 |
| β3T | −3.103 | −0.960 | −1.093 |
| β4W | 0.709 | 1.807 | 1.616 |
| β4T | 0.546 | 2.754 | 2.420 |
| β5W | — | 0.706 | 0.711 |
| β5T | — | 0.695 | 0.725 |
| R1 | 26.7951 | 43.2184 | 44.9229 |
| R2 | −108.4497 | −65.6290 | −337.6062 |
| (R1a + R1b)/(R1a − R1b) | −0.604 | −0.206 | −0.765 |
| f1p | 28.211 | 34.158 | 47.186 |
| f1n | −69.032 | −79.594 | −159.408 |
| vd1p | 49.6 | 49.6 | 53.9 |
| vd1n | 23.8 | 23.8 | 18 |
| L23W | 25.443 | 30.942 | 31.880 |
| TDW | 52.586 | 60.598 | 62.564 |
| fT/fW | 9.396 | 11.320 | 14.755 |
| (1)f1/fW | 8.834 | 11.369 | 14.988 |
| (2)β2T/β2W | 2.387 | 2.558 | 2.977 |
| (3)L23W/TDW | 0.484 | 0.511 | 0.510 |
| (4)(R1a + R1b)/(R1a − R1b) | −0.604 | −0.206 | −0.765 |
| (5)f1p/f1 | 0.624 | 0.584 | 0.714 |
| (6)R2/f1 | −2.399 | −1.122 | −5.109 |
| (7)|f2|/√(fW × fT) | 0.529 | 0.557 | 0.543 |
| (8)f1/fT | 0.940 | 1.004 | 1.016 |
| (9)Nd1p | 1.77250 | 1.77250 | 1.84300 |
| (10)vd1p/vd1n | 2.084 | 2.084 | 2.994 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-159787 filed Jul. 21, 2011, which is hereby incorporated by reference herein in its entirety.

What is claimed is:

1. A zoom lens comprising in order from an object side to an image side:
   a first lens unit of positive refractive power;
   a second lens unit of negative refractive power;
   a third lens unit of positive refractive power; and
   a rear lens group having one or more lens units,
   wherein during zooming from a wide-angle end to a telephoto end, the distance between the first lens unit and the second lens unit increases, the distance between the second lens unit and the third lens unit decreases, and the distance between the third lens unit and the rear lens group changes,
   wherein the first lens unit consists of, in order from the object side to the image side, a positive lens and a negative lens, and
   wherein the following conditional expressions are satisfied:

$$8.0 < f1/fW < 30.0$$

and $$2.0 < \beta 2T/\beta 2W < 10.0,$$

where f1 is a focal length of the first lens unit, fW is a focal length of the entire system at the wide-angle end, and β2W and β2T are respectively lateral magnifications of the second lens unit at the wide-angle end and the telephoto end.

2. The zoom lens according to claim 1, wherein the following conditional expression is satisfied:

$$0.45 < L23W/TDW < 0.80,$$

where TDW is a lens overall length at the wide-angle end, and L23W is a distance between the second lens unit and the third lens unit at the wide-angle end.

3. The zoom lens according to claim 1, wherein the following conditional expression is satisfied:

$$-0.9 < (R1a+R1b)/(R1a-R1b) < 0.5,$$

where R1a and R1b are respectively curvature radii of object side and image side lens surfaces of the positive lens of the first lens unit.

4. The zoom lens according to claim 1, wherein the following conditional expression is satisfied:

$$0.4 < f1p/f1 < 0.8,$$

where f1p is a focal length of the positive lens of the first lens unit.

5. The zoom lens according to claim 1, wherein the positive lens and the negative lens of the first lens unit are cemented together into a cemented lens, and wherein the following conditional expression is satisfied:

$$-10.0 < R2/f1 < -0.2,$$

where R2 is a curvature radius of a cemented surface of the cemented lens.

6. The zoom lens according to claim 1, wherein the following conditional expression is satisfied:

$$0.4 < |f2|/\sqrt{(fW \times fT)} < 0.7,$$

where fT is a focal length of the entire system at the telephoto end, and f2 is a focal length of the second lens unit.

7. The zoom lens according to claim 1, wherein the following conditional expression is satisfied:

$$0.7 < f1/fT < 1.2,$$

where fT is a focal length of the entire system at the telephoto end.

8. The zoom lens according to claim 1, wherein the following conditional expression is satisfied:

$$1.6 < Nd1p < 2.5,$$

where Nd1p is a refractive index of material for the positive lens of the first lens unit.

9. The zoom lens according to claim 1, wherein the following conditional expression is satisfied:

$$1.5 < vd1p/vd1n < 4.0,$$

where vd1p and vd1n are respectively Abbe numbers of materials for the positive lens and the negative lens of the first lens unit.

10. The zoom lens according to claim 1, wherein the rear lens group comprises a fourth lens unit of positive refractive power, and the fourth lens unit moves during zooming.

11. The zoom lens according to claim 1, wherein the rear lens group comprises a fourth lens unit of negative refractive power and a fifth lens unit of positive refractive power, and the fourth lens unit and the fifth lens unit move during zooming.

12. An image pickup apparatus comprising:
a zoom lens comprising in order from an object side to an image side:
a first lens unit of positive refractive power;
a second lens unit of negative refractive power;
a third lens unit of positive refractive power; and
a rear lens group having one or more lens units,
wherein during zooming from a wide-angle end to a telephoto end, the distance between the first lens unit and the second lens unit increases, the distance between the second lens unit and the third lens unit decreases, and the distance between the third lens unit and the rear lens group changes,
wherein the first lens unit consists of, in order from the object side to the image side, a positive lens and a negative lens, and
wherein the following conditional expressions are satisfied:

$$8.0 < f1/fW < 30.0$$

and $$2.0 < \beta 2T/\beta 2W < 10.0,$$

where f1 is a focal length of the first lens unit, fW is a focal length of the entire system at the wide-angle end, and $\beta 2W$ and $\beta 2T$ are respectively lateral magnifications of the second lens unit at the wide-angle end and the telephoto end; and
an image pickup device that detects an image formed by the zoom lens.

* * * * *